United States Patent
Morrison

(10) Patent No.: US 11,496,056 B2
(45) Date of Patent: Nov. 8, 2022

(54) PARALLEL BRANCHED RESONANT CONVERTER

(71) Applicant: EXCELSYS TECHNOLOGIES LTD, Cork (IE)

(72) Inventor: Richard Morrison, Cork (IE)

(73) Assignee: Excelsys Technologies Ltd., Cork (IE)

(*) Notice: Subject to any disclaimer, the term of this patent is extended or adjusted under 35 U.S.C. 154(b) by 0 days.

(21) Appl. No.: 17/197,850

(22) Filed: Mar. 10, 2021

(65) Prior Publication Data
US 2022/0294353 A1    Sep. 15, 2022

(51) Int. Cl.
*H02M 3/335* (2006.01)
*H02M 3/28* (2006.01)

(52) U.S. Cl.
CPC ....... *H02M 3/33523* (2013.01); *H02M 3/285* (2013.01)

(58) Field of Classification Search
CPC .......... H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1582; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103;
(Continued)

(56) References Cited

U.S. PATENT DOCUMENTS

| | | | |
|---|---|---|---|
| 6,344,979 B1 | 2/2002 | Huang et al. | |
| 7,518,263 B2 * | 4/2009 | Gan | H02M 3/33561 323/267 |

(Continued)

FOREIGN PATENT DOCUMENTS

CN    109660139    * 11/2020

OTHER PUBLICATIONS

Chakraborty et al., "Performance and Design of an L-C-L Converter for Voltage Regulator Type Applications", "T. IEE Japan", 1999, pp. 848-856, vol. 119-D, No. 6, Published in: JP.
(Continued)

*Primary Examiner* — Thienvu V Tran
*Assistant Examiner* — Nusrat Quddus

(57) ABSTRACT

This disclosure describes systems, methods, and apparatus for driving a plurality of output circuits from a DC input signal using a resonant converter, the resonant converter comprising a switch network, a resonant tank, and a rectifier network, the resonant tank comprising: a resonant capacitor bridge coupled across the switch network; a plurality of branches, each branch comprising at least one series inductor coupled at a first end to the resonant capacitor bridge and at a second end to the rectifier network; and at least one parallel inductor; the rectifier network comprising one or more groups of transformers, each group coupled to one branch of the plurality of branches, and wherein the primary windings of the transformers of each group are coupled in parallel, and wherein the secondary windings are configured for coupling to an output load.

20 Claims, 13 Drawing Sheets

(58) Field of Classification Search
CPC .......... H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/53873; H02M 7/53875; H02M 1/084; H02M 1/0845; H02M 5/40; H02M 5/42; H02M 5/453; H02M 7/7575; H02M 7/261; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 3/073; H02M 3/10; H02M 3/135; H02M 3/137; H02M 3/315; H02M 3/3155; H02M 7/53; H02M 7/537; H02M 7/5383; H02M 7/53862; H02M 7/5387; H02M 7/53871; H02M 7/757; H02M 7/79; H02M 3/337; H02M 3/338; H02M 3/3382; H02M 3/3384; H02M 7/538; H02M 7/53832; H02M 7/53835; H02M 7/487; H02M 7/539; H02M 7/23; H02M 7/21; H02M 7/12; H02M 7/04; H02M 7/00; H02M 7/519; H02M 7/521; H02M 7/523; H02M 7/75; H02M 7/66; H02M 7/68; H02M 7/72; H02M 2007/4835; H02M 7/515; H02M 7/525; H02M 7/527; H02M 7/529; Y02B 70/1491; H02J 3/46; H02J 3/38; H02J 3/36; H02J 3/01; H02J 3/1878; H02H 7/261; H02H 7/268; H02H 7/055; H01F 29/00; H01F 29/02; H01F 29/025; H01F 29/04; G05F 1/10; G05F 1/12; G05F 1/14; G05F 1/147; G05F 1/153; G05F 1/16; G05F 1/20; G05F 1/22; G05F 1/24; G05F 1/247; G05F 1/253; G05F 1/26; G05F 1/30; H01H 9/0005

See application file for complete search history.

(56) References Cited

U.S. PATENT DOCUMENTS

| | | | | |
|---|---|---|---|---|
| 8,054,653 B2* | 11/2011 | Ryu | ............... | H02M 3/3374 363/21.02 |
| 8,089,784 B2* | 1/2012 | Choi | ............... | H02M 3/33592 363/21.02 |
| 8,094,466 B2* | 1/2012 | Duerbaum | ........ | H02M 3/33561 363/16 |
| 8,107,262 B2* | 1/2012 | Won | ............... | H02M 3/3376 363/16 |
| 8,174,851 B2* | 5/2012 | Elferich | ............ | H02M 3/3376 363/21.02 |
| 8,629,627 B2 | 1/2014 | Cohen et al. | | |
| 9,166,488 B2* | 10/2015 | Wu | ............... | H02M 1/36 |
| 9,166,489 B2* | 10/2015 | Yan | ............... | H02M 3/33592 |
| 9,257,913 B1* | 2/2016 | McDonald | ........ | H02M 3/33569 |
| 10,003,275 B2* | 6/2018 | Chen | ............... | H01F 27/306 |
| 10,177,669 B1* | 1/2019 | Chiu | ............... | H02M 3/3376 |
| 10,298,138 B2* | 5/2019 | Jia | ............... | H02M 3/01 |
| 10,804,812 B1* | 10/2020 | Dehem | ............ | H02M 3/1584 |
| 10,840,816 B2* | 11/2020 | Sakurai | ............ | H02M 3/33592 |
| 10,958,182 B2* | 3/2021 | Ji | ............... | H02M 3/3382 |
| 11,095,227 B2* | 8/2021 | Kakalashvili | ..... | H02M 3/33592 |
| 2009/0154200 A1* | 6/2009 | Coccia | ............ | H02M 3/3376 363/21.02 |
| 2009/0290383 A1* | 11/2009 | Zhou | ............... | H02M 3/337 363/16 |
| 2011/0278927 A1 | 11/2011 | Phadke | | |
| 2011/0316430 A1* | 12/2011 | Cohen | ............ | H05B 45/382 363/16 |
| 2012/0007512 A1* | 1/2012 | Kim | ............... | H05B 45/40 315/152 |
| 2013/0063981 A1* | 3/2013 | Dujic | ............... | H02M 1/4233 363/16 |
| 2013/0127358 A1* | 5/2013 | Yao | ............... | H02M 3/01 363/21.02 |
| 2013/0194832 A1 | 8/2013 | Han et al. | | |
| 2013/0279205 A1 | 10/2013 | Keung | | |
| 2017/0133940 A1* | 5/2017 | Wilkinson | ............ | H02M 3/01 |
| 2018/0294732 A1* | 10/2018 | Ye | ............... | H02M 3/33546 |
| 2018/0337610 A1* | 11/2018 | Leong | ............ | H02M 1/083 |
| 2019/0043661 A1 | 2/2019 | Jin et al. | | |
| 2019/0058408 A1* | 2/2019 | Hao | ............... | H02M 5/4585 |
| 2019/0319532 A1* | 10/2019 | Wang | ............... | H02M 3/01 |
| 2020/0220169 A1* | 7/2020 | Kim | ............... | B29B 7/90 |
| 2020/0220469 A1 | 7/2020 | Morrison et al. | | |

OTHER PUBLICATIONS

International Search Report and Written Opinion for PCT Application No. PCT/EP2022/056170, filed Mar. 10, 2022; dated Jul. 7, 2022; 15 pages.

* cited by examiner

PARALLEL BRANCHED RESONANT CONVERTER

FIELD OF THE DISCLOSURE

The present disclosure relates generally to a resonant converter. In particular, but not by way of limitation, the present disclosure relates to systems, methods and apparatuses for driving multiple transformers using a resonant converter.

DESCRIPTION OF RELATED ART

Resonant converters, such as LLC resonant converters, are widely used in commercial applications such as consumer electronics. In a conventional LLC resonant converter circuit, a DC input signal is converted to a square wave signal by an inverter circuit. The square wave signal is further coupled to multiple transformers via a resonant tank. To obtain DC output voltage, the sinusoidal output current isolated from the resonant tank by the transformer is rectified and stabilized by a large capacitance, hence providing a stable output DC voltage at the load.

However, the state of existing LLC resonant converters, especially for high power applications, is challenged due to significant power loss, thermal challenges, and multiple high frequency eddy currents. Thus, there is a need for a cost effective LLC resonant converter topology suitable for high power applications, which not only optimizes resonant tank gains, but also minimizes power loss.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Various LLC resonant converter topologies are known in the art. For example, U.S. patent publication 2017/0133940 A1 (herein referred to as the '940 publication) discloses a LLC resonant converter circuit with multiple transformers having their primaries coupled in series and having matched output currents. Another known LLC resonant converter circuit disclosed in the '940 publication comprises multiple transformers having their primaries coupled in parallel and coupled to a plurality of series inductors and a parallel inductor. The '940 publication is incorporated herein by reference in its entirety.

As described above, in some cases, existing LLC resonant converter topologies may not be viable for high power applications due to significant power loss, thermal challenges and multiple high frequency eddy currents. In some circumstances, in spite of a redesign of the series resonant inductors to minimize gap flux fringing and multiple high frequency eddy currents, the core temperature of the transformers may exceed a safety threshold.

For instance, to enable higher-power applications, the resonant tank of FIGS. 1 and 2, where all output module 108 transformers are arranged in parallel, may be split intro a branched topology as shown in FIGS. 3 and 4, thereby reducing a current density that each branch is exposed to. However, each branch uses a distinct parallel resonant inductor leading to much larger package/board requirements, and greater heat dissipation challenges.

To overcome these challenges, and to maintain the resonant tank gains of each branch, the parallel resonant inductors, which are arranged between the series resonant inductors and the output modules in FIGS. 3-4, can be combined into a single parallel resonant inductor and moved to the left of the series resonant inductors, as seen in FIGS. 5 and 6. In other words, a single parallel resonant inductor can be arranged between the series resonant inductors and the capacitor bridge.

More generally, the present disclosure relates to a branched resonant converter for driving multiple groups of transformers with the primary windings of the transformers in each group or branch connected in parallel. Some aspects of the disclosure relate to minimizing losses in the series resonant inductors by separating the transformers into different groups, each group consisting of a plurality of transformers connected in parallel.

In some cases, resonant converters may achieve high efficiency and allow high frequency operation with their intrinsic soft-switching. In addition, magnetic integration, for example, utilizing transformer magnetizing and leakage inductors as resonant elements in some resonant converters, may facilitate low component count and cost. Generally, resonant converters comprise three distinct stages: a switch network, a resonant tank, and a rectifier network. In some examples, the switch network generates a pulsating voltage or current from a DC voltage or current source and feeds it into the resonant tank stage. Further, the rectifier network receives the pulsating voltage or current from the resonant tank and rectifies the pulsating signal into a DC voltage or current at the output. In some cases, one or more loads may be coupled at the output.

In some embodiments, the switch network may comprise one or more switches, such as MOSFETs. In one example, the switch network may comprise series connected MOSFETs in a half-bridge configuration. In some embodiments, the resonant tank may be a two port network formed by one or more inductors and capacitors, and the resonant tank may be configured to modulate its gain amplitude by changing the pulsating signal frequency. In some embodiments, the resonant tank may comprise a resonant capacitor bridge coupled across the switch network, where the resonant capacitor bridge may comprise two capacitors in series.

Some embodiments of the disclosure may be characterized as a resonant converter circuit comprising: a switch network, a resonant tank, and a rectifier network, wherein the switch network is coupled at one end to a voltage or current source, and at a second end to the resonant tank; wherein the resonant tank comprises: a resonant capacitor bridge coupled across the switch network; a plurality of branches, each branch comprising one or more resonant inductors, including at least one series inductor, wherein a first end of the at least one series inductor is coupled to the resonant capacitor bridge circuit, and wherein a second end of the at least one series inductor is coupled to a rectifier network; and at least one parallel inductor; wherein the rectifier network comprises: one or more groups of transformers, each group coupled to one branch of the plurality of branches, wherein each group comprises a plurality of transformers, and wherein each transformer of the one or more groups of transformers comprises primary and secondary windings, the secondary windings configured for coupling to an output load; a plurality of connections to couple the plurality of transformers of each group in parallel, wherein one end of the primary windings of each of the plurality of transformers is coupled to a respective second end of the at least one series inductor of a respective branch, and wherein another end of the primary windings of each of the plurality of transformers is coupled to the switch network.

Other embodiments of the disclosure may also be characterized as a method for driving a plurality of output circuits from a DC input signal, the method comprising: providing a switch network; converting the DC input signal to an AC signal using the switch network; coupling a resonant capacitor bridge across the switch network; coupling a resonant inductor network to the switch network and the resonant capacitor bridge, the resonant inductor network comprising at least one parallel inductor and a plurality of branches, each branch comprising one or more inductors, including at least one series inductor, wherein a first end of the at least one series inductor is coupled to the resonant capacitor bridge circuit; coupling the AC signal through the resonant capacitor bridge and the resonant inductor network to one or more groups of transformers, wherein each group comprises a plurality of transformers, and wherein each transformer includes a primary and a secondary winding, the secondary windings configured to be coupled to an output load; coupling each group of transformers to one branch of the plurality of branches such that the primary windings of the plurality of transformers of a respective group are in parallel, wherein one end of the primary windings of the transformers in a respective group is coupled to a respective second end of the at least one series inductor of a respective branch, and wherein another end of the primary windings of the transformers is coupled to the switch network.

In some embodiments, the at least one parallel inductor comprises a parallel inductor for each branch of the plurality of branches, the parallel inductor of each branch coupled in parallel across the primary windings of the transformers of a respective group. In some embodiments, a number of series inductors of the plurality of branches equals a number of parallel inductors of the plurality of branches.

In some embodiments, a number of series inductors is greater than a number of the at least one parallel inductor. In some embodiments, the at least one parallel inductor comprises a single parallel inductor, wherein the plurality of branches of the resonant tank are coupled in parallel across the single parallel inductor.

In some embodiments, the first end of the at least one series inductor of each branch is coupled to one end of the single parallel inductor, and wherein the second end of the at least one series inductor of each branch is coupled in series to the primary windings of the transformers of a respective group via a portion of the plurality of connections.

In some embodiments, the switch network comprises a half bridge pair of switches, wherein the switches are selected from a group consisting of a Metal Oxide Semiconductor Field Effect Transistor (MOSFET), a Bipolar Junction Transistor (BJT), a FinFET, a power MOSFET, and an Insulated-Gate Bipolar Transistor (IGBT). In some embodiments, at least one transformer of a group of transformers is a center tapped transformer, and wherein a rectifier circuit is coupled across the secondary windings of the center tapped transformer.

In some embodiments, the rectifier circuit comprises a first rectifier switch (e.g., a diode, a MOSFET, etc.) coupled at a first end to a first end of the secondary windings of the center tapped transformer, and a second rectifier switch coupled at a first end to a second end of the secondary windings of the center tapped transformer.

In some embodiments, the resonant converter circuit further comprises a capacitor configured to be coupled across the output load such that one end of the capacitor is configured to be coupled to a positive terminal of the output load and a central output winding of the center tapped transformer, and another end of the capacitor is configured to be coupled to a negative terminal of the output load and second ends of the first and second rectifier switches. Some non-limiting examples of rectifier switches may include diodes or MOSFETs.

In some embodiments, the rectifier network further comprises a plurality of rectifier circuits, each rectifier circuit coupled across the secondary windings of one transformer of the plurality of transformers, each rectifier circuit comprising a capacitor and one or more switches, such as diodes or MOSFETs, and wherein the capacitor is coupled across a respective output load. In some embodiments, each rectifier circuit is selected from a group consisting of a half-wave and full-wave rectifier, and wherein the full-wave rectifier comprises one of a center tapped full wave rectifier or a bridge rectifier. In some embodiments, the switch network comprises a half bridge pair of MOSFETs. In some embodiments, one end of the at least one parallel inductor is coupled to a center of the half bridge pair of MOSFETs.

In some embodiments, the resonant capacitor bridge comprises a resonant capacitor half bridge comprising two capacitors arranged in series, and wherein the first end of the at least one series inductor for each of the plurality of branches is coupled to a center of the resonant capacitor half bridge.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
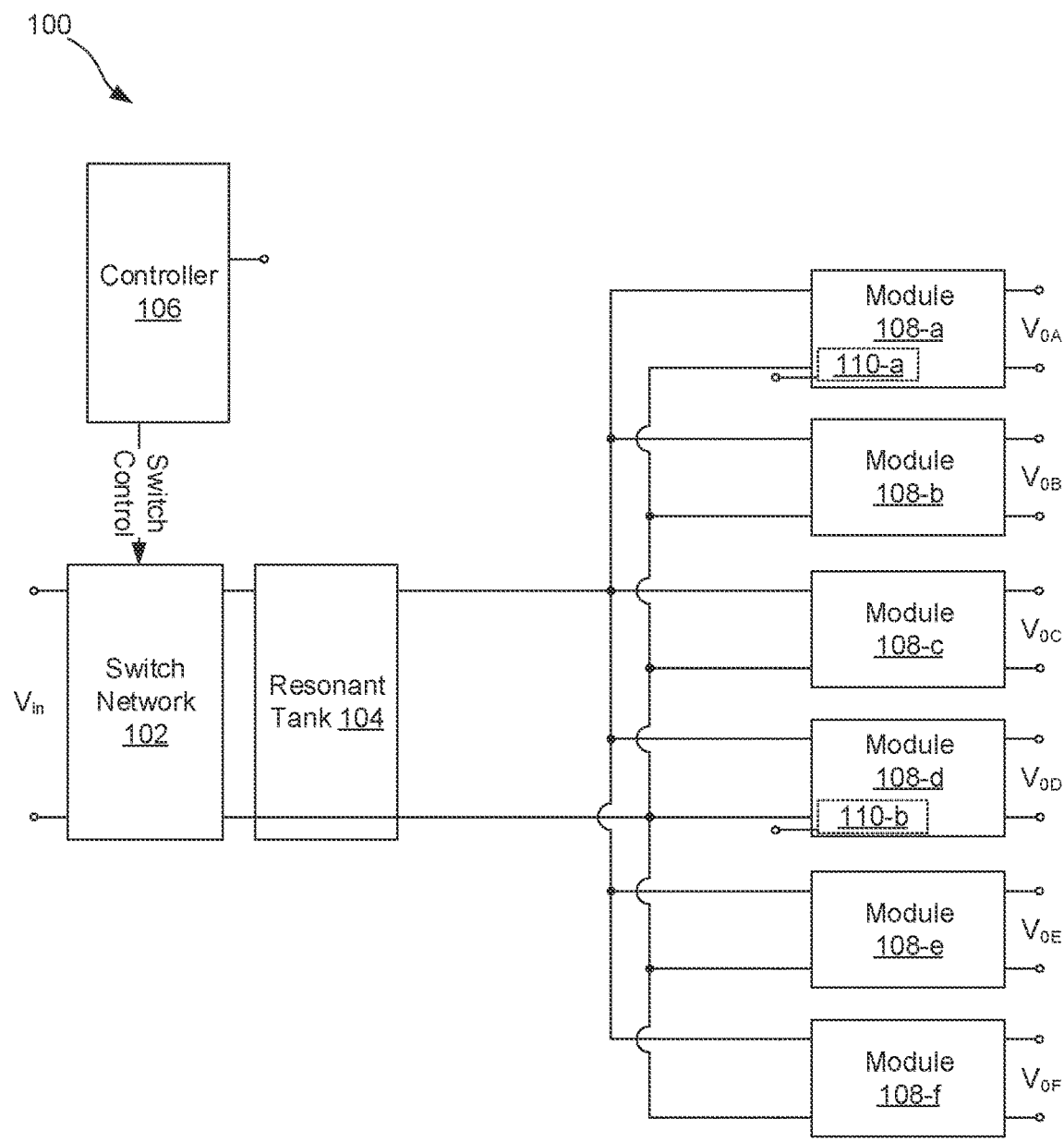
FIG. 1 illustrates a system diagram of a resonant converter in accordance with one or more implementations.

The present disclosure relates generally to a branched resonant converter configured for driving multiple groups of transformers with the primary windings of the transformers in each group or branch connected in parallel. More specifically, but without limitation, the present disclosure relates to minimizing losses in the series resonant inductors coupled to the primary windings of the transformers by separating the transformers into different groups, each group consisting of a plurality of transformers having their primary windings connected in parallel.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

As previously described, in some cases, resonant converters comprise three distinct stages: a switch network, a resonant tank, and a rectifier network. In some examples, the switch network generates a pulsating voltage or current from a DC voltage or current source and feeds it into the resonant tank stage. Further, the rectifier network receives the pulsating voltage or current from the resonant tank and rectifies the pulsating signal into a DC voltage or current at the output. In some cases, one or more loads may be coupled at the output.

In some embodiments, the switch network may comprise one or more switches, such as MOSFETs. In one example, the switch network may comprise series connected MOSFETs in a half-bridge configuration. In some embodiments, the resonant tank may be a two port network formed by one or more inductors and capacitors, and a controller may be configured to modulate the resonant tank's gain amplitude by changing the pulsating signal frequency from the switch network. In some embodiments, the resonant tank may comprise a resonant capacitor bridge coupled across the switch network, where the resonant capacitor bridge may comprise at least two capacitors in series. The resonant tank may further comprise an inductor network having two or more resonant inductors, including at least one series inductor and at least one parallel inductor. Different inductor network topologies are contemplated in different embodiments, further described in detail below.

Figure 10:
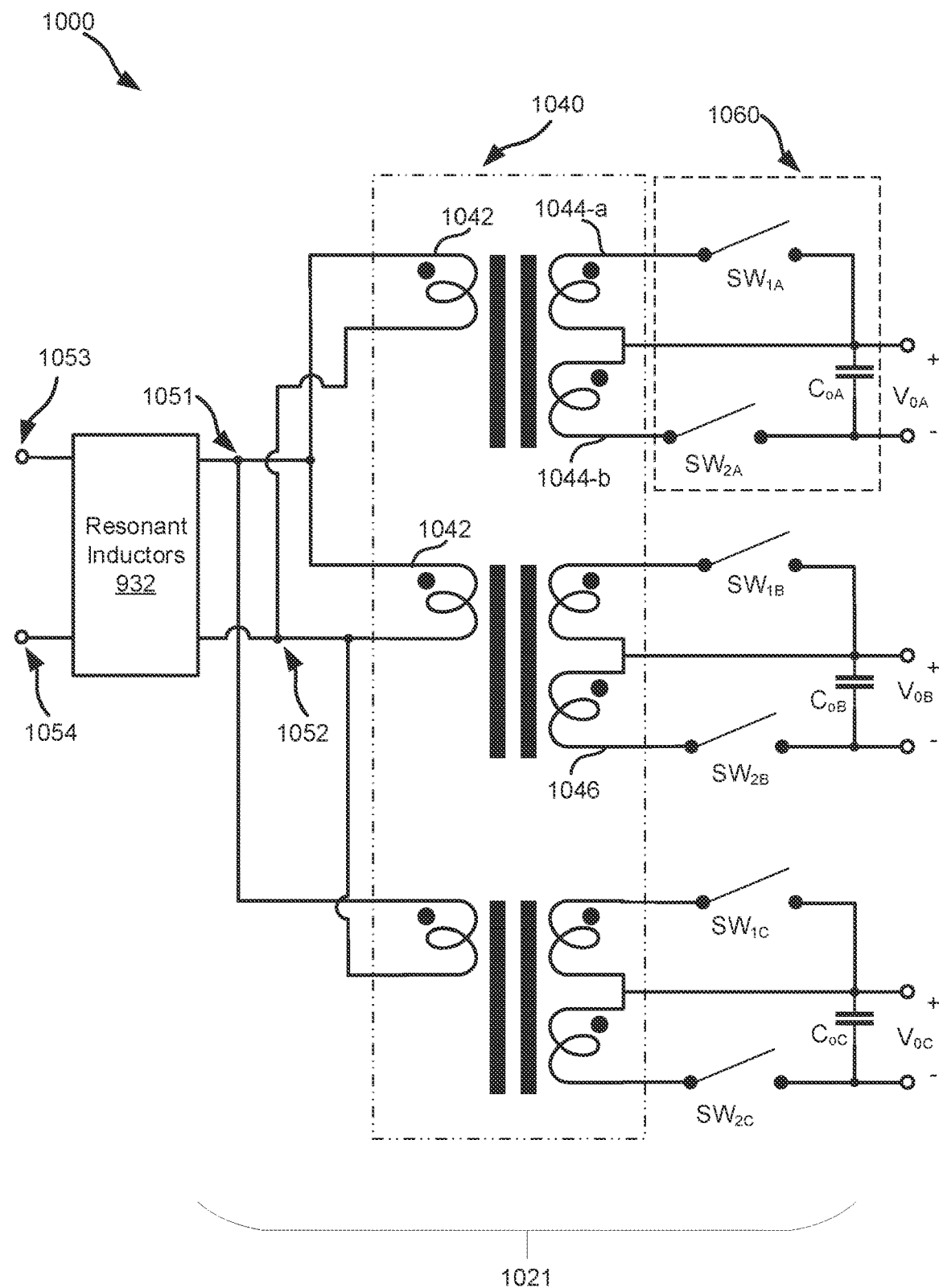
FIG. 10 illustrates an example schematic diagram of a rectifier network showing one or more transformers in accordance with one or more implementations.

FIG. 1 illustrates a system diagram of a resonant converter 100 in accordance with one or more implementations. As shown, the resonant converter 100 may comprise a switch network 102, a resonant tank 104, one or more modules 108 (e.g., modules 108-$a$, 108-$b$, 108-$c$, 108-$d$, 108-$e$, and 108-$f$), and a controller 106. In some cases, the controller 106 may be configured to control one or more switches (e.g., MOSFETs) in the switch network 102. In some embodiments, each of the one or more modules 108 may comprise a transformer having one or more primary and secondary windings. FIG. 10 provides one example of a trio of modules such as those shown in FIG. 1. Further, one or more modules 108 (e.g., modules 108-$a$ and 108-$d$) may comprise an opto-coupler module 110 (e.g., optional optocoupler module 110-$a$, optional opto-coupler module 110-$b$), for instance, having a collector and an emitter, or some other device for transferring data over the isolation boundary and back to the controller 106. In some examples, each of the one or more modules 108 may further comprise a rectifier circuit coupled to the secondary windings of the respective transformer of the given module 108. As shown, the resonant converter 100 may comprise a plurality of connections to couple the modules 108 in parallel. For instance, the primary windings of the plurality of transformers (not shown) may be coupled at one end to the resonant tank 104 and at another end to the switch network 102. The secondary windings of the transformers of the output modules 108 may be configured for coupling to output loads (not shown), where the voltage delivered across the output loads may be represented by $V_{OA}$, $V_{OB}$, $V_{OC}$, $V_{OD}$, $V_{OE}$, and $V_{OF}$. In some embodiments, the opto-coupler modules 110, or other devices for transferring data over the isolation boundary, may be coupled to the controller 106. Further, the output from at least one opto-coupler module 110 (e.g., opto-coupler module 110-$a$) may be monitored by the controller 106 based on which the controller 106 may adjust the switching frequency of the switch network 102. In some instances, multiple modules 108 may have opto-coupler modules 110, but only one of these may provide data to the controller 106 for adjusting the switching frequency of the switch network 102. In this way, one of the modules 108 can control, via its opto-coupler 110, the resonant converter switching frequency, and hence power delivered to each of the modules 108.

Figure 2:
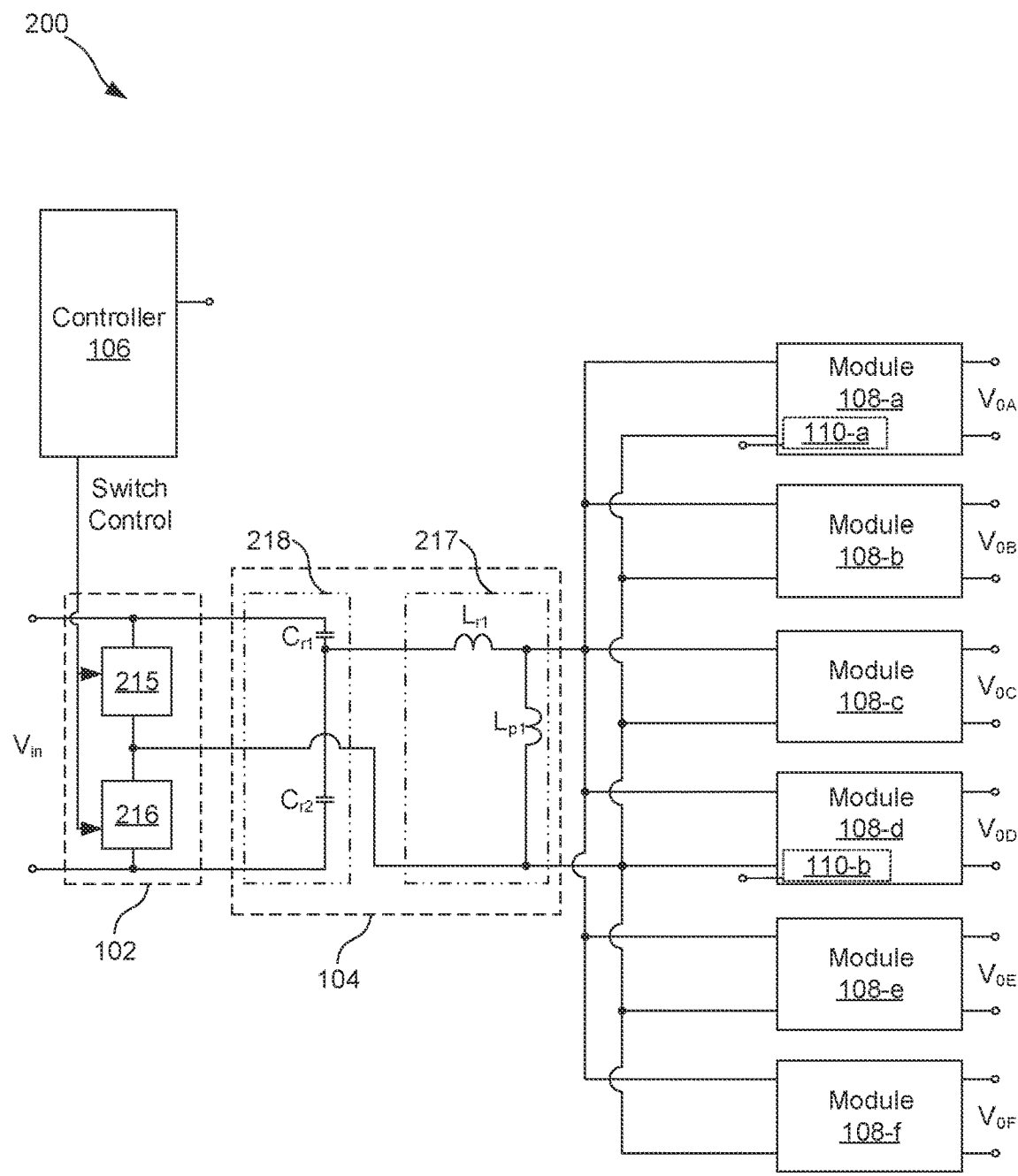
FIG. 2 illustrates an example schematic diagram of the resonant converter in FIG. 1 in accordance with one or more implementations.

FIG. 2 illustrates an example schematic diagram of a resonant converter 200 in accordance with one or more implementations. In some examples, resonant converter 200 may be similar or substantially similar to the resonant converter 100 in FIG. 1. Resonant converter 200 includes a controller 106, a switch network 102, and a resonant tank 104. The switch network 102 may comprise switches 215 and 216, which may be examples of MOSFETs, or another applicable switch. In the example shown, the switches 215 and 216 may be arranged in a half-bridge configuration and may be configured to receive control instructions from the controller 106. The control instructions may be used to adjust the switching frequency of the switch network 102.

In some embodiments, the resonant tank 104 may comprise a resonant capacitor bridge 218 (e.g., a resonant capacitor half-bridge) comprising one or more resonant capacitors (e.g., $C_{r1}$, $C_{r2}$) coupled across the switch network 102, and a resonant inductor network 217 comprising one or more resonant inductors ($L_{r1}$, $L_{p1}$), where one end of the resonant inductor network 217 is coupled to a center of the resonant capacitor bridge 218 and another end is coupled to a center of the half-bridge configuration of switches 215 and 216. For instance, the resonant inductor network 217 may comprise at least one series inductor (e.g., $L_{r1}$) and at least one parallel inductor (e.g., $L_{p1}$), where a first end of the series inductor is coupled to the center of the resonant capacitor bridge 218 and the second end is coupled to a first end of the parallel inductor. In other words, the at least one parallel inductor can be arranged between the at least one series resonant inductor and the output modules 210. Further, the second end of the parallel inductor may be coupled to the center of the switch network, for instance, between the switches 215 and 216. In some cases, the second end of the series inductor and the first end of the parallel inductor may also be coupled to first ends of the primary windings of the transformers of the output modules 108, while the second ends of the primary windings of the transformers may be coupled to the second end of the parallel inductor and/or the center of the switch network. In this way, the primary windings of the transformers of the output modules 108 may be coupled in parallel across the parallel inductor (i.e., $L_{p1}$). In some circumstances, such a configuration may facilitate in minimizing ripples (or amplitude variations) in the output voltages delivered to the output loads. In one example, using this configuration, the output voltage at no load gets significantly higher (e.g., >10%, >5%, >15%, etc.) than at heavy load. While not shown, in some embodiments, buck converter post-regulators may be utilized on the secondary side of the transformers prior to delivery of output power. In some cases, the maximum output power delivered through buck converter post-regulators may vary, for instance, depending on the number of transformers used. In one non-limiting example, up to 4 transformers may be connected in parallel to deliver a maximum output power of 600 W. In another example, up to 6 transformers may be connected in parallel for delivering a maximum output power of 1.8 kW through buck converter post-regulators. In yet other cases, up to 6 transformers may be utilized to deliver a maximum output power of 1 kW.

It should be noted that the number of transformers and maximum output powers described above are merely examples, and not intended to be limiting. In some cases, each output module 108 may be one of convection cooled or forced air cooled. In some examples, convection cooling may comprise natural convection cooling, wherein air surrounding the object (e.g., transformer core) transfers the heat away from the object without utilizing any fans or blowers. In some other examples, convection cooling may comprise the use of another fluid (e.g., oil or water), for instance, if the transformer is an oil immersed transformer. In such cases, the heat generated in the core and winding may be transferred to the oil. Some non-limiting examples of oil immersed transformers may include Oil Natural Air Natural (ONAN) transformers, Oil Natural Air Forced (ONAF) transformers, Oil Forced Air Forced (OFAF) transformers, and Oil Forced Water Forced (OFWF) transformers.

To reduce losses from high currents on a single bus and to reduce the chances of fire from high current densities, the resonant inductor network can be split into branches, thereby reducing a current density delivered to each of multiple groups of output modules. Non-limiting examples of branched resonant inductor networks are presented in FIGS. 3-10.

Figure 3:
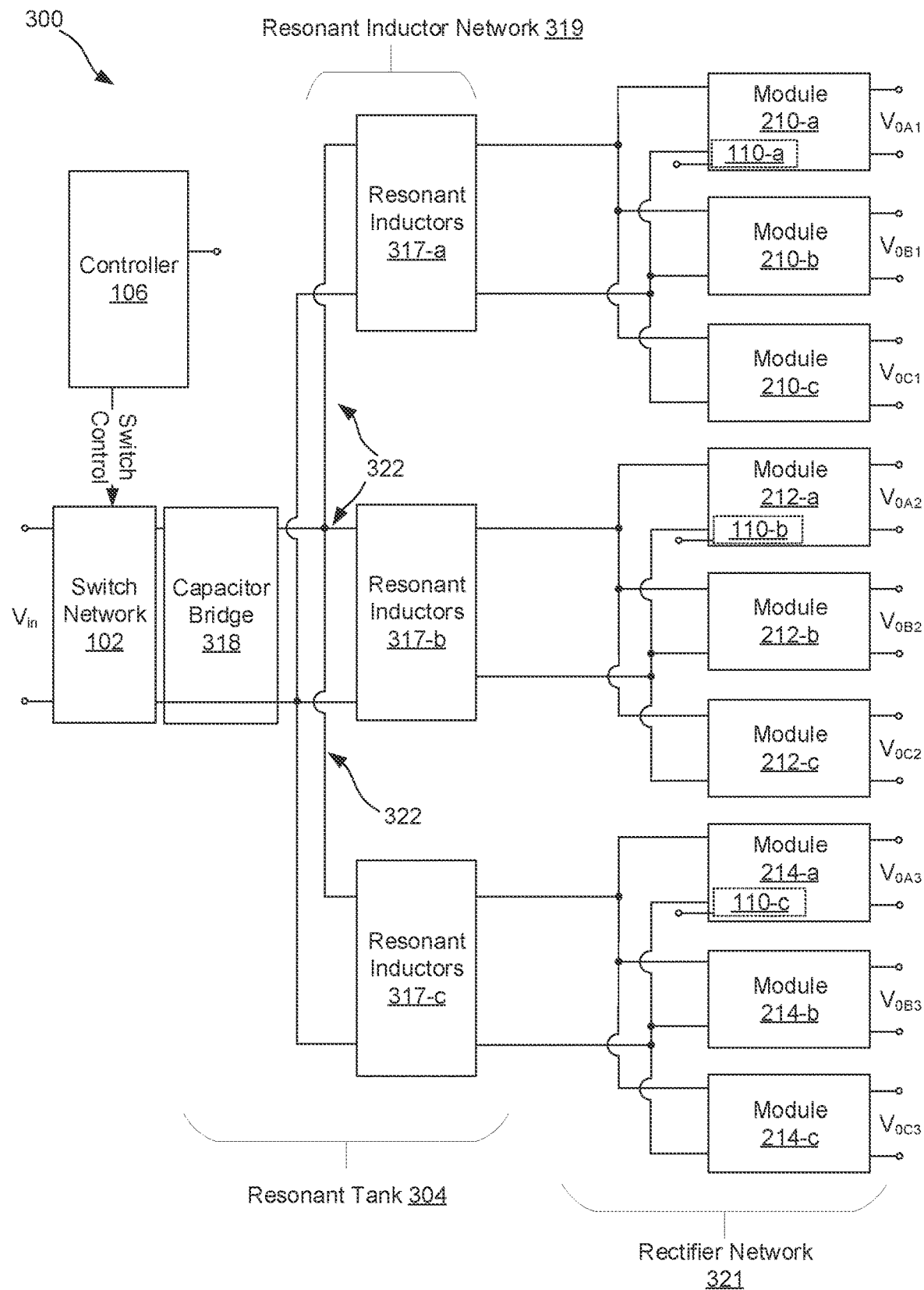
FIG. 3 illustrates a system diagram of a resonant converter according to an embodiment of the disclosure.

FIG. 3 illustrates a system diagram of a resonant converter 300 according to an embodiment of the disclosure. Resonant converter 300 may implement one or more aspects of the figures described herein. In some embodiments, the resonant converter 300 may comprise a resonant tank 304, the resonant tank comprising a resonant capacitor bridge 318 and a resonant inductor network 319. The resonant capacitor bridge 318 may be similar or substantially similar to the resonant capacitor bridge 218 described in relation to FIG. 2. As shown, the resonant inductor network 319 of the resonant tank 304 may comprise a plurality of branches 322, each branch comprising one or more resonant inductors 317 (e.g., resonant inductors 317-a, 317-b, 317-c). In some cases, the resonant inductors 317 may comprise at least one series inductor, at least one parallel inductor, or a combination thereof, further described in relation to FIG. 4. The resonant converter 300 may further comprise a rectifier network 321, where the rectifier network 321 comprises a plurality of connections for coupling to one or more groups of modules, for instance, a first group of modules 210 (e.g., modules 210-a, 210-b, 210-c), a second group of modules 212 (e.g., modules 212-a, 212-b, 212-c), and a third group of modules 214 (e.g., modules 214-a, 214-b, 214-c). In some cases, each of the one or more modules of the different groups of modules may comprise a transformer having primary and secondary windings, further described in relation to FIG. 10. As seen in FIG. 3, each branch of resonant inductors 317 may be coupled to a group of modules such that the primary windings of the transformers in each group may be connected in parallel. In some embodiments, a first end of the primary windings of the transformers in a group may be connected to a second end of a series inductor of a respective branch, while the second end of the primary windings may be coupled to the switch network 102. In one example, the second ends of the primary windings of the transformers may be coupled to a center of a half-bridge configuration of MOSFETs of the switch network 102. Additionally, a first end of the series inductor of a respective branch may be coupled to the capacitor bridge 318, for instance, at a center of the capacitor bridge 318. In some examples, the secondary winding of each transformer of the multiple groups of transformers may be configured to be coupled to an output load (not shown). In FIG. 3, the voltages ($V_{OA1}$, $V_{OB1}$, $V_{OC1}$, $V_{OA2}$, $V_{OB2}$, $V_{OC2}$, $V_{OA3}$, $V_{OB3}$, $V_{OC3}$) represent the output voltages delivered by the different modules across the different output loads. While not shown, the rectifier network 321 may comprise one or more rectifier circuits, further described in relation to FIG. 10, where the secondary winding of each transformer may be coupled to an output load through one of the one or more rectifier circuits. In some cases, the output of each transformer may be rectified by the rectifier circuit and further stabilized (e.g., using a capacitor coupled across the output load to minimize ripple voltage) to provide a stable output voltage (e.g., $V_{OA1}$, $V_{OB1}$, $V_{OC1}$, etc.).

The resonant converter topology described in relation to FIG. 3 serves to divide the primary current into one or more branches (e.g., 3 branches in FIG. 3, but any other number of two or more branches can also be implemented), such that each series inductor is subject to a fraction (e.g., $Current_{max}/N$ where N is the number of branches) of the maximum current relative to the series inductor in FIGS. 1 and/or 2. Similar branching and the resulting reduction in current for each branch can be seen in FIG. 4.

Figure 4:
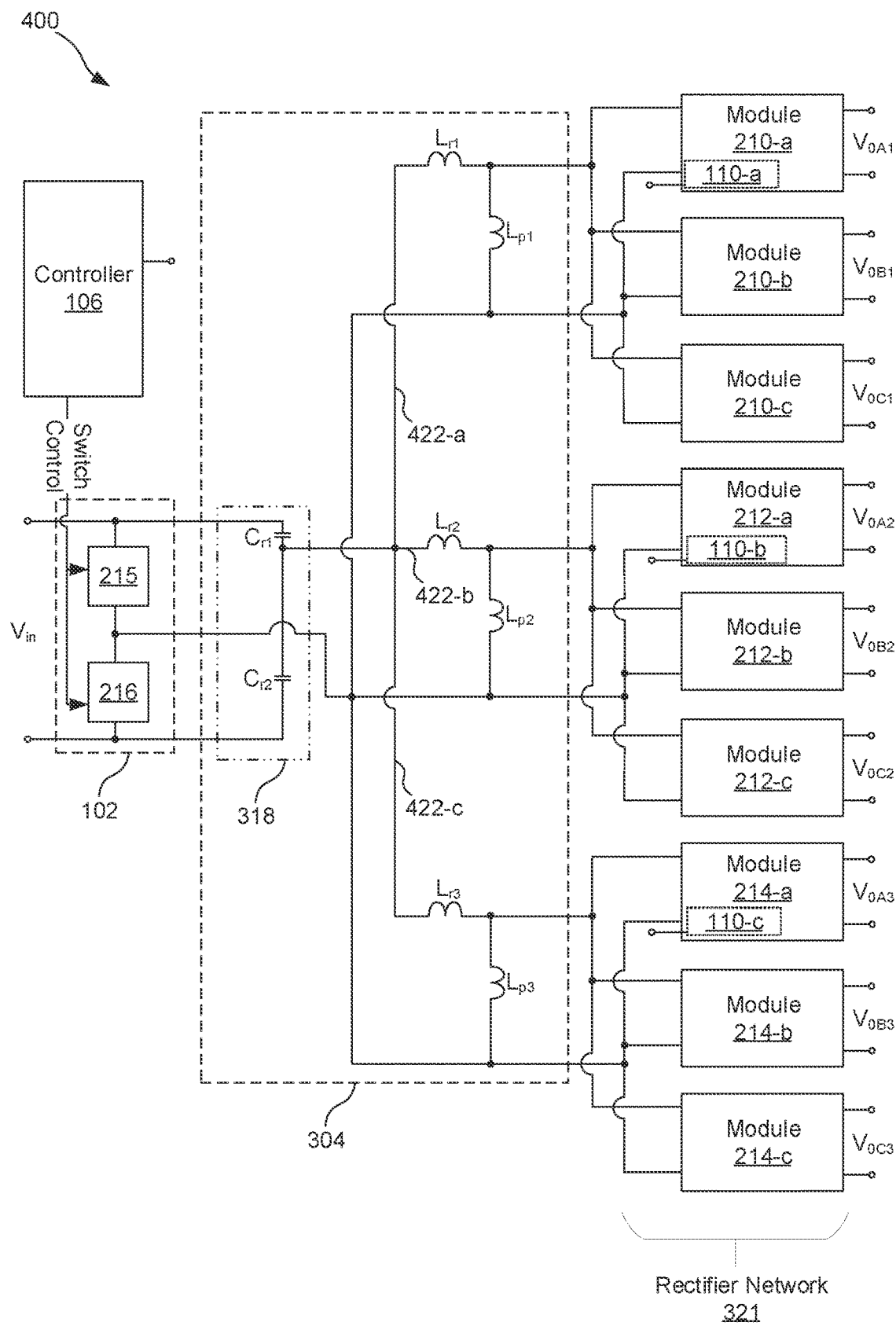
FIG. 4 illustrates an example schematic diagram of the resonant converter in FIG. 3 according to an embodiment of the disclosure.

In some cases, the resonant converters in FIGS. 2, 3, and 4 may utilize the same transformer cores and the same number of turns in their primary and secondary windings. However, the gap between the primary and secondary windings may be reduced in FIGS. 3 and/or 4 as compared to FIG. 2, which may serve to increase the inductance (e.g., double the inductance) and thus maintain the same resonant frequency. In this way, while the transformers in FIGS. 2, 3, and 4 may have the same core loss, the transformers in FIGS. 3 and/or 4 may have lower conduction losses. In some cases, however, the use of multiple parallel inductors (e.g., one for each branch) to balance the resonant tank gains of each branch may add cost and/or power loss. Additionally or alternatively, the topology described in relation to FIGS. 3 and/or 4 may also introduce thermal challenges because of the increase in space associated with multiplying the number of series and parallel inductors by the number of branches compared to a non-branched topology (e.g., FIGS. 1-2).

FIG. 4 illustrates an example schematic diagram of a resonant converter 400 according to an embodiment of the disclosure. In some examples, the resonant converter 400 may be similar or substantially similar to the resonant converter 300 in FIG. 3, and may include the controller 106, the switch network 102 having switches 215 and 216, the resonant tank 304 having a resonant capacitor bridge 318 coupled across the switch network 102, and the rectifier network 321. As shown, the resonant tank 304 may comprise a plurality of branches 422 (e.g., branch 422-a, branch 422-b, branch 422-c), each branch comprising one or more resonant inductors, including at least one series inductor (e.g., $L_{r1}$, $L_{r2}$, $L_{r3}$). In this example, each branch may further comprise at least one parallel inductor (e.g., $L_{p1}$, $L_{p2}$, $L_{p3}$) such that the number of series inductors is equal to the number of parallel inductors.

In the example shown, the rectifier network 321 may comprise one or more groups of modules (e.g., modules 210, modules 212, modules 214) or transformers, where each group of modules or transformers is coupled to one branch of the plurality of branches 422. For instance, a first group comprising modules 210-a, 210-b, 210-c may be coupled to a first branch 422-a of resonant inductors, a second group comprising modules 212-a, 212-b, and 212-c may be coupled to a second branch 422-b of resonant inductors, and a third group comprising modules 214-a, 214-b, and 214-c may be coupled to a third branch 422-c of resonant inductors. As noted above, each of the modules 210, 212, and 214 may comprise a transformer having primary and secondary windings, where the secondary windings are configured to be coupled to an output load. In some embodiments, the modules 210, 212, and 214 may further comprise a rectifier circuit for stabilizing the output voltage (e.g., $V_{OA1}$, $V_{OB1}$, $V_{OC1}$, $V_{OA2}$, $V_{OB2}$, $V_{OC2}$, $V_{OA3}$, $V_{OB3}$, $V_{OC3}$) delivered to the output loads. In some cases, one end of the series resonant inductor (e.g., $L_{r1}$) of each branch 422 may be coupled to the resonant capacitor bridge 318. Further, another end of the series resonant inductor (e.g., $L_{r1}$) and one end of the parallel inductor (e.g., $L_{p1}$) of each branch may be coupled to one end of the primary windings of the transformers in one of the one or more groups. Further, the other end of the parallel inductor in each branch and the other ends of the primary windings of the transformers in each group may be coupled to a center of the switch network 102. In some examples, the switch network 102 may comprise a half-bridge configuration of MOSFETs. In this way, the primary windings of the transformers in each group may be coupled in parallel across the resonant tank 304.

In some embodiments, at least a portion of output modules of the one or more branches may be coupled to post regulators (e.g., buck converter post regulators, buck-boost converter post regulators, boost converter post regulators, to name a few non-limiting examples), which may serve to adjust the output voltages delivered to their respective loads. For instance, one or more post regulators may each be coupled between the secondary windings of a respective output module and a respective load. In some other cases, the post regulators may be examples of linear regulators. In some non-limiting examples, a linear regulator may be coupled between the secondary windings of an output module with an opto-coupler module, such as module 210-a. Further, the linear regulator and the opto-coupler module may be implemented in a feedback loop back to the switches of the switch network via the controller 106. The controller 106 may then adjust the switching frequency based on these feedback signals. In some cases, only one of the output modules with an opto-coupler module (e.g., module 210-a), referred to as a Master Bulk module, may be configured to provide feedback signals. In this way, the Master Bulk module may dictate the output voltages delivered by at least a portion of the other output modules, including the other output modules with an opto-coupler module (e.g., module 212-a, module 214-a).

Figure 5:
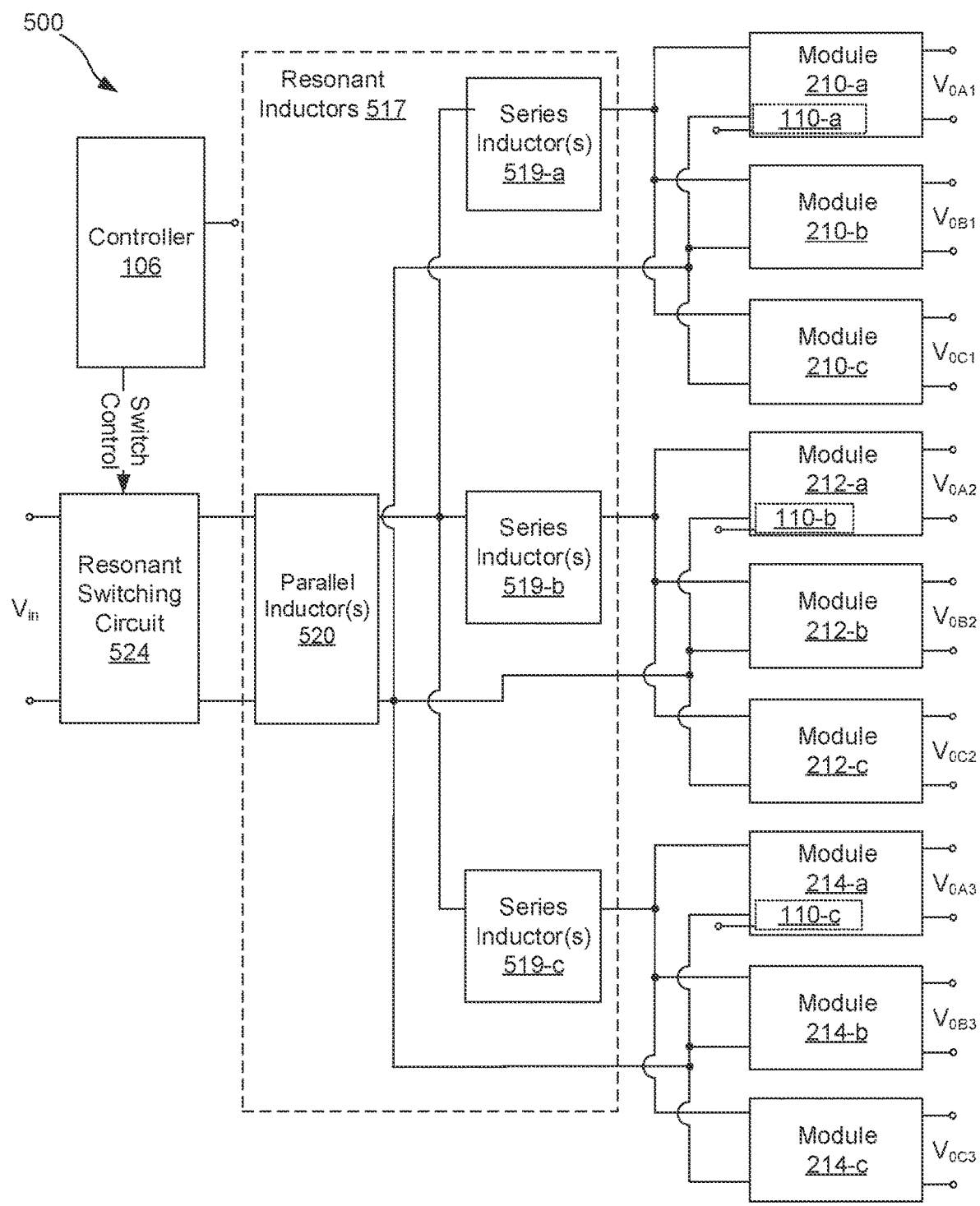
FIG. 5 illustrates a system diagram of a resonant converter according to an alternate embodiment of the disclosure.

FIG. 5 illustrates a system diagram of a resonant converter 500 according to an alternate embodiment of the disclosure. Resonant converter 500 implements one or more aspects of the figures described herein. For ease of representation, the resonant converter 500 is shown as having a resonant switching circuit 524, where the resonant switching circuit 524 comprises a switch network (e.g., switch network 102 in FIGS. 1-4) and a resonant capacitor bridge (e.g., resonant capacitor bridge 218 in FIG. 2, resonant capacitor bridge 318 in FIGS. 3, 4, and/or 6). The resonant converter 500 may also comprise a controller 106 configured to generate a switch control signal for adjusting the switching frequency of the switch network. In some cases, the switch network may comprise a half-bridge configuration of MOSFETs, although other types of switches (e.g., JFETs, BJTs, etc.) in different configurations (e.g., full bridge configuration) are contemplated in different embodiments. In the example shown in FIG. 5, resonant inductors 517 of the resonant tank may comprise one or more parallel inductor(s) 520 and one or more series inductors 519 (e.g., series inductors 519-a, series inductors 519-b, series inductors 519-c) for each branch of the resonant tank. In some cases, for instance, when multiple parallel inductor(s) are used and shared between the one or more branches, they may appear as a single parallel inductor 520 in the resonant tank. While FIGS. 3-4 showed the one or more parallel inductors arrange to the right of the series inductors, or between the one or more series inductors and the output modules, here, the multiple parallel inductors have been replaced by a single parallel inductor 520 (or a string of series-coupled inductors) arranged to the left of the series inductors 519. In other words, the parallel inductor(s) 520 is arranged between the resonant switching circuit 524 and the series inductors 519. As an example, the total inductance value for two inductors ($L_x$ and $L_y$) arranged in parallel may be calculated using the sum of their reciprocal values $$\frac{1}{L_x} \text{ and } \frac{1}{L_y},$$

respectively. Specifically, when $L_x$ and $L_y$ are arranged in parallel, they may be appear as a single inductor ($L_{pz}$), where the inductance of $L_{pz}$ may be represented by:

$$\frac{1}{L_{pz}} = \frac{1}{L_x} + \frac{1}{L_y}, \tag{1}$$

which may be simplified to:

$$L_{pz} = \frac{L_x \times L_y}{L_x + L_y}. \tag{2}$$

Contrastingly, when a plurality of inductor(s) are arranged in series, their total inductance value may be represented by a sum of their individual inductance values. For instance, when $L_x$ and $L_y$ are arranged in series, they may be appear as a single inductor ($L_{sz}$), where the inductance of $L_{sz}$ may be represented by:

$$L_{sz} = L_x + L_y \tag{3}.$$

In some embodiments, the single parallel inductor 520 may be shared between the one or more branches. In some aspects, the single parallel inductor 520 may facilitate in balancing the resonant tank gains of each branched series inductor 519. In this way, the primary input current may be divided into branches such that each branched series inductor 519 may be subjected to only a fraction (i.e., depending on the number of branches or number of branched series resonant inductors 504) of the maximum input current. In the example shown in FIG. 5, and assuming the series inductors 519-*a*, 519-*b*, and 519-*c* are of the same or equal magnitude, each series inductor 519 may only be subject to a third of the maximum input current (i.e., since there are three branches). In some cases, by moving the parallel inductor to the other side of the series resonant inductors seen in FIGS. 3 and/or 4, a single choke in this position may be realized with the same or similar size core as that of FIGS. 1 and/or 2, which may serve to deliver a resonant tank with similar gain/frequency characteristics to that of FIGS. 1 and/or 2. It should be noted that, the topology shown in FIGS. 5 and/or 6 may be scaled to higher powers, for instance, by increasing the number of branches of series inductors. Thus, scaling can be achieved with far less increase is consumed board space than if the purely branched topologies of FIGS. 3-4 are scaled. Additionally or alternatively, higher power levels may be supported by increasing the number of parallel connected transformer primary windings connected in parallel to each branch.

In some embodiments, each branch may be coupled to one group of modules (e.g., first group of modules 210, second group of modules 212, third group of modules 214, etc.) such that the single parallel inductor 520 is coupled in parallel across the parallel coupled primary windings of the different groups of transformers. Said another way, the primary windings of the transformers in each group of transformers may be coupled in parallel (i.e., since one end of the primary windings of each transformer in a group is coupled in series to one end of the series inductor 519 in a respective branch and the other end of the primary windings in the group is coupled to the switch network of the resonant switching circuit 524), and the single parallel inductor 520 may be coupled in parallel across the different groups of transformers (i.e., since one end of the parallel inductor 520 and the other end of each primary winding of the different groups of transformers is coupled to the switch network of resonant switching circuit 524). Said yet another way, transformers or modules in a given branch (e.g., modules 210 in a first branch, modules 212 in a second branch, modules 214 in a third branch) may be coupled to a series inductor 519 in their respective branch, while all transformers or modules, regardless of branch, are coupled to the single parallel inductor 520.

Figure 6:
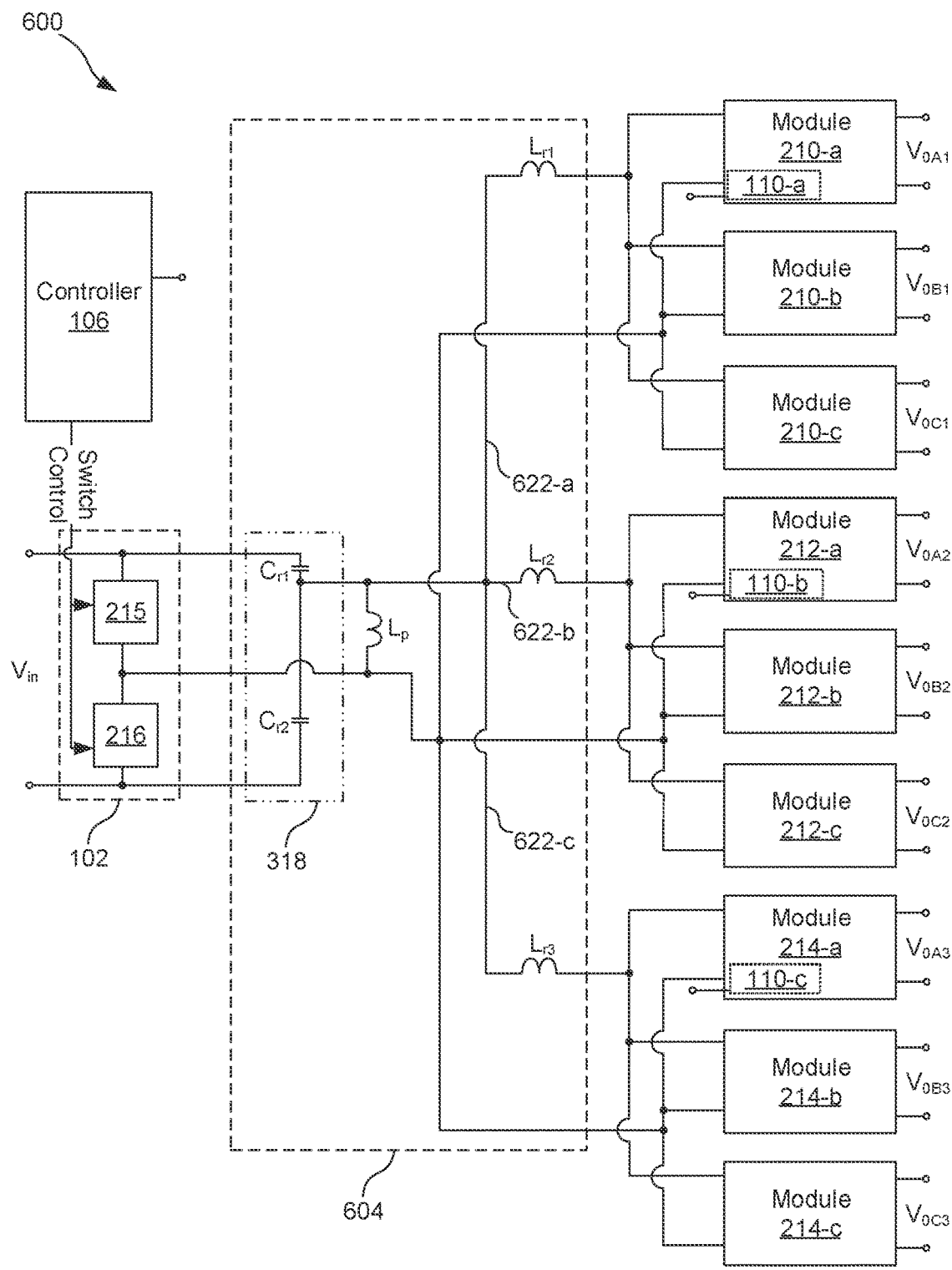
FIG. 6 illustrates a schematic diagram of the resonant converter in FIG. 5 according to an alternate embodiment of the disclosure.

FIG. 6 illustrates a schematic diagram of a resonant converter 600, which may be similar or substantially similar to the resonant converter 500 in FIG. 5. As seen in FIG. 6, the resonant converter 600 comprises a resonant tank 604 having a single parallel inductor (i.e., $L_p$) shared between branches 622-*a*, 622-*b*, and 622-*c*, which is in contrast to the topology seen in FIGS. 3 and 4, where the resonant tank 304 comprises a parallel inductor for each branch 322. In some embodiments, each branch 622 comprises a series resonant inductor (e.g., $L_{r1}$, $L_{r2}$, $L_{r3}$) coupled at one end to the parallel inductor ($L_p$) and the resonant capacitor bridge 318 and coupled at another end to the primary windings of the transformers of a respective group. The parallel inductor, $L_p$, can be arranged between the resonant capacitor bridge 318 and the series inductors $L_{r1}$, $L_{r2}$, $L_{r3}$.

In some cases, resonant tank 604 further comprises a resonant capacitor bridge 318, where the resonant capacitor bridge 318 may be coupled across the switch network 102. In some examples, the switch network 102 comprises switches 215 and 216. The resonant capacitor bridge 318, switch network 102, modules 210, 212, 214, controller 106, and optional opto-coupler modules 110 may be similar or substantially similar to the ones previously described in relation to any of FIGS. 1-5. For instance, the resonant capacitor bridge 318 in FIG. 6 may comprise a half bridge configuration of capacitors $C_{r1}$ and $C_{r2}$ arranged in series. A first end of the single parallel inductor ($L_p$) may be coupled to a center of the resonant capacitor bridge 318, while its second end may be coupled to a center of the switch network 102, for instance, between switches 215 and 216. Additionally, the first end of the single parallel inductor ($L_p$) may also be coupled to a first end of the respective series inductor (e.g., $L_{r1}$, $L_{r2}$, $L_{r3}$) in each branch 622 (e.g., first branch 622-*a*, second branch 622-*b*, third branch 622-*c*), while the second end of the respective series inductor in each branch 622 may be coupled in series to one end of the primary windings of the transformers or modules in the respective branch. In some cases, the other end of the primary windings of the transformers or modules in each branch may be coupled to the second end of the single parallel inductor and the center of the switch network 102 (i.e., at a point between switches 215 and 216). In this way, the primary windings of the transformers or modules in each group of transformers (i.e., first group of modules 210, second group of modules 212, third group of modules 214) may be coupled in parallel, and the single parallel inductor ($L_p$) may be coupled in parallel across the different groups of transformers or modules. Thus, the transformers or modules in a given branch (e.g., modules 210 in a first branch 622-*a*, modules 212 in a second branch 622-*b*, modules 214 in a third branch 622-*c*) may be coupled to a series inductor (e.g., $L_{r1}$, $L_{r2}$, $L_{r3}$) in their respective branch, while all transformers or modules, regardless of branch, may be coupled to the single parallel inductor ($L_p$).

Figure 7:
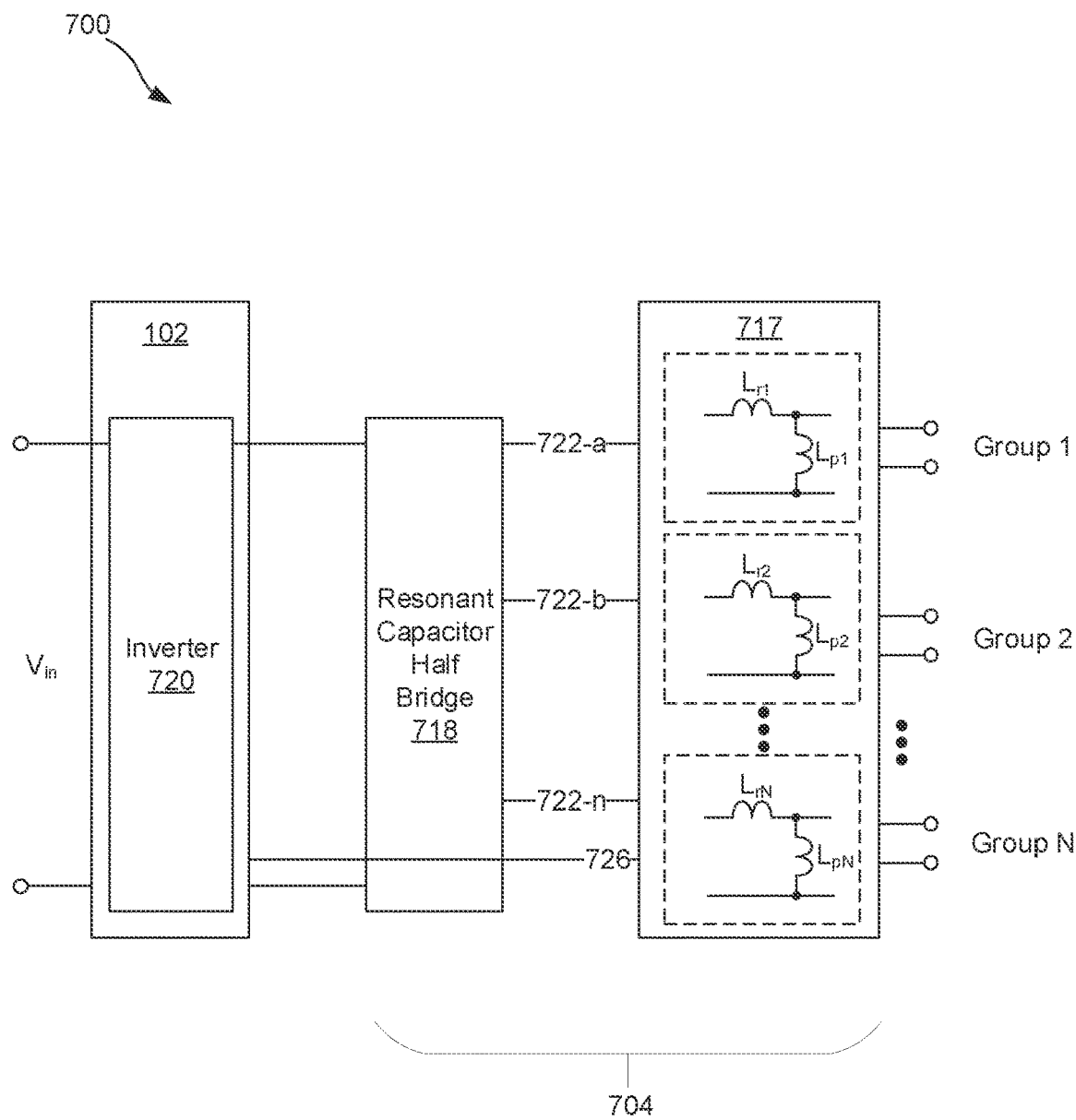
FIG. 7 illustrates an example of resonant converter having a first inductor network topology according to an embodiment of the disclosure.
Figure 8:
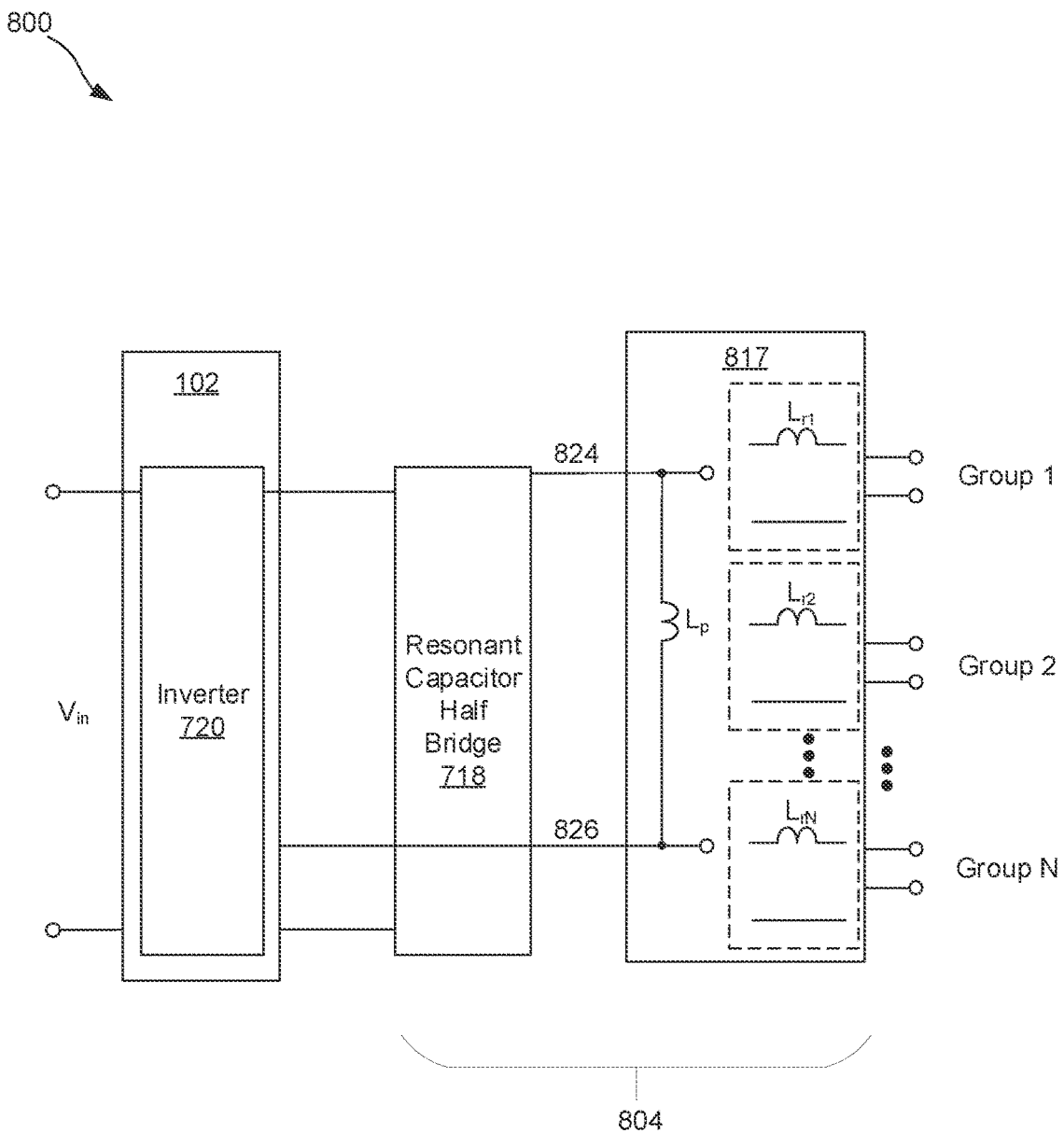
FIG. 8 illustrates an example of a resonant converter having a second inductor network topology according to an alternate embodiment of the disclosure.
Figure 9:
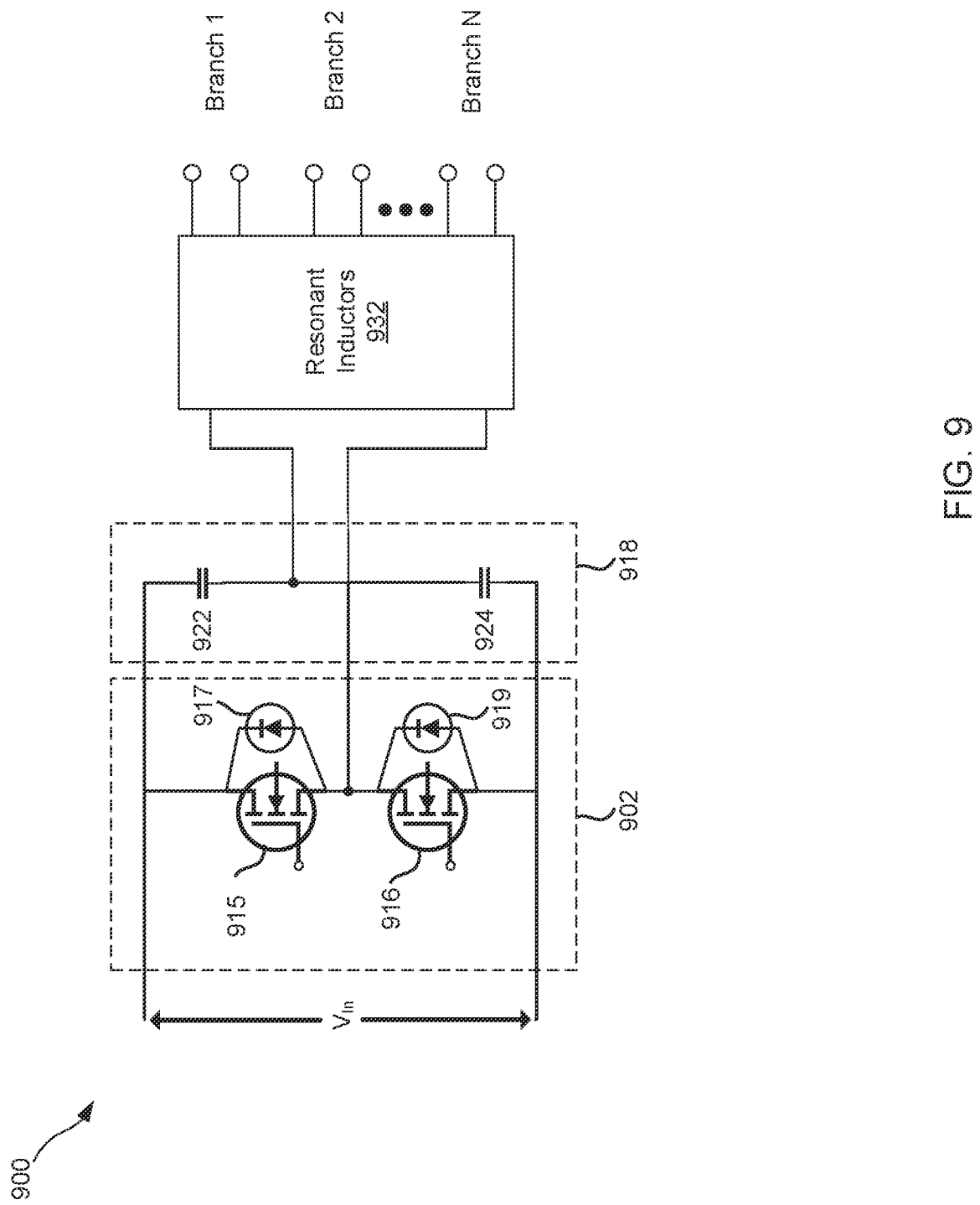
FIG. 9 illustrates an example schematic diagram of a switch network and resonant capacitor bridge in accordance with one or more implementations.

Although the examples illustrated thus far have shown three branches, one of skill in the art will appreciate that any number, N, of two or more branches can be implemented, and FIGS. 7-9 help illustrate this generalization. FIG. 7 illustrates an example of a resonant converter 700 having a first inductor network topology according to an embodiment of the disclosure. In some examples, resonant converter 700 may implement one or more aspects of the figures described herein. Resonant converter 700 may be similar or substantially similar to the resonant converters 300 and/or 400 previously described in relation to FIGS. 3 and/or 4, respectively.

Resonant converter 700 may comprise a switch network 102, a resonant tank 704 having a resonant capacitor half bridge 718 and resonant inductors 717 arranged according to a first inductor network topology. In some embodiments, the resonant capacitor half bridge 718 may be coupled across the switch network 102. The resonant tank 704 may be similar or substantially similar to the resonant tank 304 previously described in relation to FIGS. 3 and/or 4. In some aspects, the inductor network topology shown in FIG. 7 depicts the topology shown in FIGS. 3 and/or 4 scaled to a higher power (i.e., 'N' instead of 3, where N>3).

As seen in FIG. 7, the first inductor network topology may be implemented by forming a plurality of branches 722 (e.g., N branches), each branch comprising a series resonant inductor (e.g., $L_{r1}, L_{r2}, \ldots, L_{rN}$, etc.) and a parallel resonant inductor (e.g., $L_{p1}, L_{p2}, \ldots, L_{pN}$, etc.). For instance, a first branch 722-a may comprise series inductor ($L_{r1}$) and parallel inductor ($L_{p1}$), while a second branch 722-b may comprise series inductor ($L_{r2}$) and parallel inductor ($L_{p2}$), and an $N^{th}$ branch 722-n may comprise series inductor ($L_{rN}$) and parallel inductor ($L_{pN}$). One end of the series inductor in each branch may be coupled to the resonant capacitor half bridge 718, while its other end may be coupled to the primary windings of the transformers in one group of the one or more groups (e.g., Group 1, Group 2, Group N, etc.). Additionally, one end of the parallel inductor in a respective branch may also be coupled to the other end of the series inductor in the branch, as well as the primary windings of the transformers in a respective group coupled to the branch. In some cases, the other end of the parallel inductor in each branch may be coupled to the switch network 102 via connection 726.

In some embodiments, the switch network 102 may be an example of an inverter circuit 720. In some examples, DC input (represented as $V_{in}$) to the resonant converter 700 may first be converted to an AC signal, such as a square wave signal, by the inverter circuit 720. The AC signal may in turn be fed to the plurality of transformers of Groups 1 through N through the resonant capacitor half bridge 718 coupled across the inverter circuit 720, and the resonant inductors 717.

FIG. 8 illustrates an example of a resonant converter 800 having a second inductor network topology according to an embodiment of the disclosure. The resonant converter 800 comprises switch network 102, and a resonant tank 804 having a resonant capacitor half bridge 718 and resonant inductors 817 arranged according to a second inductor network topology. In some embodiments, the resonant capacitor half bridge 718 may be coupled across the switch network 102. In some circumstances, the switch network 102 may serve as an inverter circuit (e.g., inverter circuit 720), and may be configured to convert the DC input signal (represented as $V_{in}$) to an AC signal (e.g., a square wave signal). In some examples, the resonant converter 800 may be similar or substantially similar to the resonant converter 500 and/or 600 previously described in relation to FIGS. 5 and/or 6.

As seen, the inductor network topology of the resonant inductors 817 in FIG. 8 may comprise the use of a single parallel inductor (i.e., $L_p$) shared between multiple branches, each branch having at least one series resonant inductor (e.g., $L_{r1}, L_{r2}, \ldots, L_{rN}$). Connection 824 may couple one end of the parallel inductor ($L_p$) and one end of the series resonant inductor (e.g., $L_{r1}, L_{r2}, \ldots, L_{rN}$) in each branch to the resonant capacitor half bridge 718, while connection 826 may couple the other end of the parallel inductor ($L_p$) and the primary windings of the transformers in each group (i.e., Groups 1 through N) to the switch network 102. In other words, the parallel inductor ($L_p$) can be arranged between the resonant capacitor half bridge 718 and the series inductors $L_{r1}, L_{r2}, \ldots L_{rn}$. In some aspects, the single parallel inductor (i.e., $L_p$) may facilitate in balancing the resonant tank gains of each branched series inductor (e.g., $L_{r1}, L_{r2}, \ldots, L_{rN}$). In this way, the primary input current may be divided into branches such that each branched series inductor may be subjected to only a fraction (e.g., Current-$_{max}$/N where N is the number of branches) of the maximum input current. In some cases, by moving the parallel inductor to the other side of the series resonant inductors seen in FIGS. 3, 4, and/or 7, a single choke in this position may be realized with the same or similar size core as that of FIGS. 1 and/or 2, which may serve to deliver a resonant tank with similar gain/frequency characteristics to that of FIGS. 1 and/or 2. It should be noted that, the topology shown in FIG. 8 depicts the topology shown in FIGS. 5 and/or 6 scaled to a higher power (i.e., 'N' instead of 3, where N>3). In this way, scaling can be achieved with far less increase in consumed board space than if the purely branched topologies of FIGS. 3-4 are scaled. Additionally or alternatively, higher power levels may be supported by increasing the number of parallel connected transformer primary windings connected in parallel to each branch.

In some examples, the resonant converter 800 may also comprise a controller (e.g., shown as controller 106 in FIGS. 5 and/or 6) configured to generate a switch control signal for adjusting the switching frequency of the switch network 102. In some cases, the switch network may comprise a half-bridge configuration of MOSFETs, although other types of switches (e.g., JFETs, BJTs, etc.) in different configurations (e.g., full bridge configuration) are contemplated in different embodiments.

In some embodiments, each branch may be coupled to one group of modules (e.g., shown as first group of modules 210, second group of modules 212, third group of modules 214, etc., in FIGS. 5 and/or 6) such that the single parallel inductor (e.g., $L_p$) is coupled in parallel across the parallel coupled primary windings of the different groups of transformers. Said another way, the primary windings of the transformers in each group of transformers may be coupled in parallel (i.e., since one end of the primary windings of each transformer in a group is coupled in series to one end of the series inductor (e.g., $L_{r1}$) in a respective branch and the other end of the primary windings in the group is coupled to the switch network 102 via connection 826), and the single parallel inductor may be coupled in parallel across the different groups of transformers (i.e., since one end of the parallel inductor and the other end of each primary winding of the different groups of transformers is coupled to the switch network 102 via connection 826). Said yet another way, transformers or modules in a given branch may be coupled to a series inductor in their respective branch, while all transformers or modules, regardless of branch, may be coupled to the single parallel inductor.

FIG. 9 illustrates an example schematic diagram 900 of a switch network and capacitor bridge in accordance with one or more implementations. As seen, FIG. 9 illustrates a switch network 902 having switches 915 and 916. In some cases, the switches 915 and 916 may be examples of MOSFETs arranged in a half-bridge configuration across the DC input (Vin). In some cases, the switch network 902 may serve as an inverter circuit for converting the DC input signal to an AC signal (e.g., a square wave signal). In this example, the switches 915 and 916 are N type MOSFETs, although other types of switches (e.g., P type MOSFETs, BJTs, JFETs, FINFETs, etc.) are contemplated in different embodiments. In some cases, diodes 917 and 919 may be coupled across the switches 915 and 916, respectively. Additionally, a resonant capacitor bridge 918 comprising capacitors 922 and 924 arranged in series may be coupled across the switch network 902. The switch network 902 and resonant capacitor bridge 918 may be similar or substantially similar to the switch network 102 and resonant capacitor bridge 218 and/or 318, respectively, described in relation to FIGS. 1-8.

As described above, in some embodiments, one or more resonant inductors 932 arranged according to one of the topologies described in relation to FIG. 7 or 8 may be coupled at one end to a center of the resonant capacitor bridge 918 and at another end to a center of the switch network 902. In the example shown, Branches 1 through N provide connections for connecting one or more groups of output modules or transformers (e.g., shown as groups of modules 210, 212, 214 in FIG. 4), each group having a plurality of modules or transformers. In some cases, each branch (e.g., Branch 1) may be configured to couple to a group of transformers or modules (e.g., modules 210), where the group of transformers may comprise a plurality of transformers (e.g., modules 210-a, 210-b, 210-c). In some cases, the primary windings of the transformers in a group may be connected in parallel.

FIG. 10 illustrates an example schematic diagram 1000 of a rectifier network showing one or more transformers in accordance with one or more implementations. As seen, FIG. 10 illustrates a rectifier network 1021, which may be an example of the rectifier network 321 previously described in relation to FIGS. 3 and 4 and that could be implemented in embodiments similar to those shown in FIGS. 5-8. The rectifier network 1021 may be coupled at one end (e.g., end 1051) to the resonant inductors 932 and at another end (e.g., end 1052) to the switch network, as previously described in relation to FIG. 9. Additionally, one end (e.g., end 1053) of the resonant inductors 932 may be coupled to the resonant capacitor bridge, for instance, at a center of a resonant capacitor half bridge, while another end (e.g., end 1054) may be coupled to the switch network. In some examples, the voltage potential at ends 1052 and 1054 may be the same. For the sake of simplicity, FIG. 10 only illustrates one transformer group 1040 coupled to the resonant tank and switch network. In this example, the transformer group 1040 comprises three transformers, each having primary and secondary windings. In some cases, the primary windings 1042 of the transformers in the group may be coupled in parallel, while each of their secondary windings 1046 may be coupled across a respective output load (optionally via output regulation using one of a linear regulator, a buck converter regulator, to name a few non-limiting examples). In some embodiments, the transformers may be examples of center tapped transformers. In some cases, a rectifier circuit may be coupled across the secondary windings 1044 of each center tapped transformer. The rectifier circuit may be implemented using switches (e.g., $SW_{1A}$, $SW_{2A}$, $SW_{1B}$, $SW_{2B}$, $SW_{1C}$, $SW_{2C}$, etc.), and may be selected from a group consisting of a half-wave and a full-wave rectifier, where the full-wave rectifier comprises one of a center tapped full wave rectifier or a bridge rectifier. For instance, FIGS. 13A-13E show some non-limiting examples of alternative rectifier topologies.

In the example shown, the rectifier network 1021 comprises one or more center tapped full wave rectifiers. In some examples, the output of each transformer may be rectified by a rectifier circuit (e.g., rectifier circuit 1060) and further stabilized using a capacitor to provide a stable output voltage at the output load. As illustrated, the rectifier circuit 1060 may comprise a first switch (e.g., $SW_{1A}$) coupled at a first end to a first end 1044-a of the secondary windings 1046 of the center tapped transformer, and a second rectifier switch (e.g., $SW_{2A}$) coupled at a first end to a second end 1044-b of the secondary windings 1046 of the center tapped transformer. Some non-limiting examples of switches that may be used to implement the rectifier circuit may include diodes or MOSFETs. In some cases, the rectifier circuit 1060 may further comprise a capacitor (e.g., $C_{OA}$) configured to be coupled across the output load such that one end of the capacitor is configured to be coupled to a positive terminal of the output and a central output winding of the center tapped transformer, and another end of the capacitor is configured to be coupled to a negative terminal of the output load and second ends of the first and second rectifier diodes or switches. In some cases, voltages $V_{OA}$, $V_{OB}$, $V_{OC}$ represent output voltages delivered to the respective output loads coupled to the secondary windings 1046 of the transformers. In some cases, a stable output voltage may refer to an output voltage where the difference between the minimum and maximum voltage is under a threshold (e.g., <1 volt, <10 volts, etc.). Additionally or alternatively, a stable output voltage may refer to an output voltage having a ripple voltage under a threshold. In some aspects, the capacitor (e.g., $C_{OA}$) coupled across the output load may be configured to smooth the rectified voltage waveform from the rectifier switch bridge configuration of the rectifier circuit 1060, which may serve to minimize the ripple voltage. The rectified voltage waveform from each rectifier switch bridge configuration may be smoothed by charging/discharging the respective capacitor, which may facilitate a cleaner DC signal with minimal ripple voltage at the output load. In some cases, the ripple voltage that appears after smoothing may vary depending on the capacitance of the capacitor, the output load, etc., to name a few non-limiting examples. Other filters or smoothing topologies beyond the capacitors illustrated may also be implemented.

Each of the three sets of transformers, switch pairs, and capacitors, can be an example of one of the output modules 108, 210, 212, 214, seen in FIGS. 1-6.

FIGS. 13A-13E show some example topologies of rectifier circuits 1300-a, 1300-b, 1300-c, 1300-d, and 1300-e, respectively, in accordance with one or more implementations. In some cases, any of the rectifier circuits 1300-a-e may be coupled to the secondary windings of the transformers of the output modules to rectify an AC voltage (e.g., sinusoidal output) to a DC waveform. In this way, the output voltage ($V_o$) provided to the output loads may be a DC voltage. In some cases, different transformers (e.g., of the same or a different branch) may utilize different ones of rectifier circuits 1300. Alternatively, all the transformers of a resonant converter may utilize the same rectifier circuit 1300 (e.g., rectifier circuit 1300-a). While not shown, in some cases, a post output regulation circuit (e.g., a linear regulator, buck converter regulator) may be coupled between the rectifier circuit 1300 and the load, which may be used to control the output voltage ($V_o$) delivered to the load.

Figure 11:
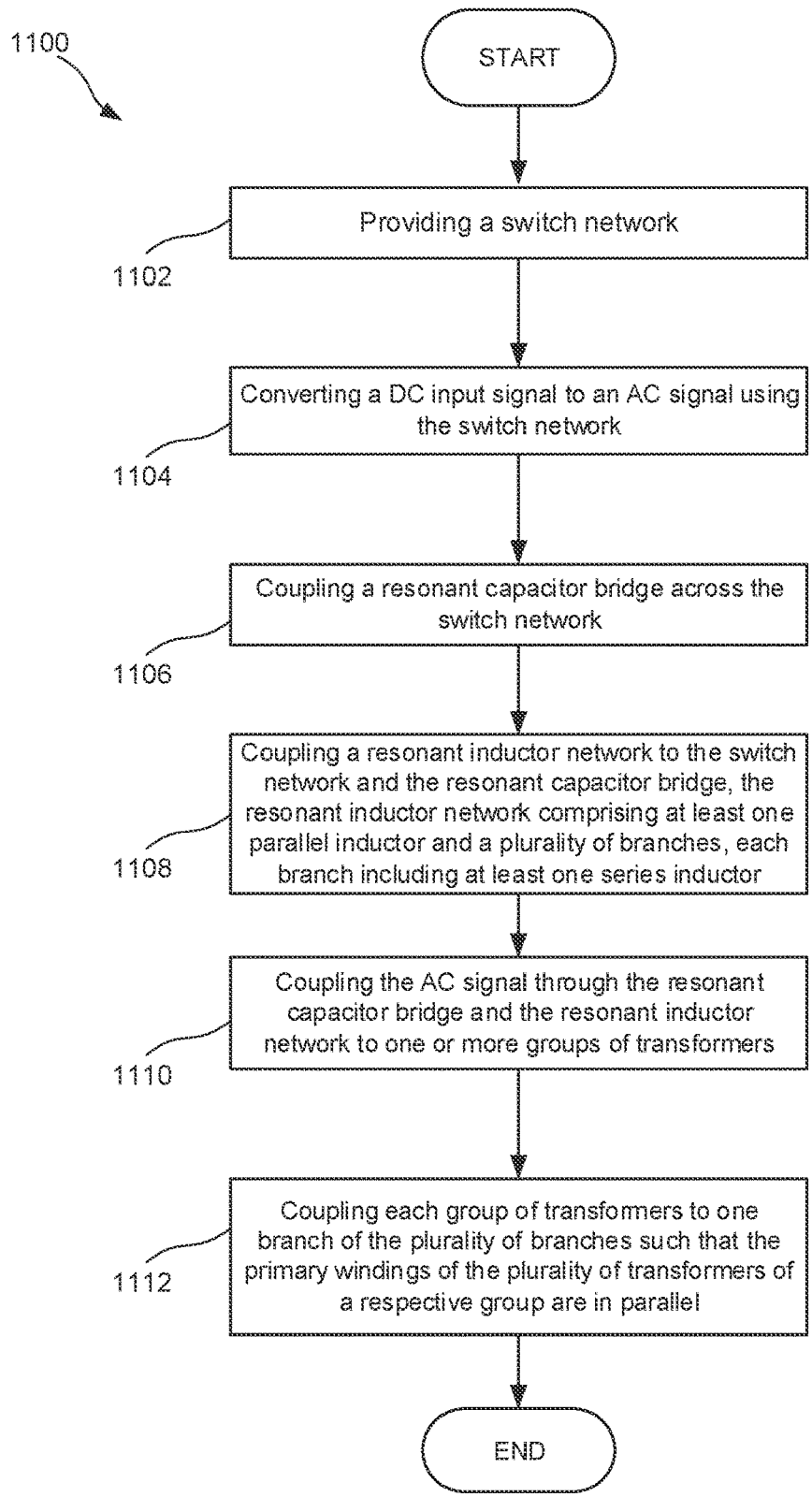
FIG. 11 illustrates a flowchart of a method for driving a plurality of output circuits from an input signal, according to an embodiment of the disclosure.

FIG. 11 illustrates a flowchart of a method 1100 for driving a plurality of output circuits from a DC input signal, in accordance with one or more implementations. In some examples, method 1100 may implement one or more aspects of the figures described herein.

Method 1100 may begin with providing a switch network at Block 1102. The switch network may be an example of any of the switch networks described herein, for instance, switch network 102. In some cases, the switch network 102 may comprise a half-bridge configuration of MOSFETs, although other types of switches are contemplated in different embodiments.

At Block 1104, the method 1100 may comprise converting the DC input signal to an AC signal (e.g., a square wave signal) using the switch network. At Block 1106, the method may comprise coupling a resonant capacitor bridge across the switch network. In some examples, the resonant capacitor bridge may comprise a half-bridge configuration of capacitors. For instance, the resonant capacitor bridge may comprise two capacitors in series coupled across the switch network.

At Block 1108, the method may comprise coupling a resonant inductor network to the switch network and the resonant capacitor bridge. In some examples, the resonant inductor network may comprise at least one parallel inductor and a plurality of branches, each branch comprising one or more inductors, including at least one series inductor. The resonant inductor network may be implemented in any one of the topologies described herein, such as the topology described in relation to FIGS. 3, 4 and 7, or the topology described in relation to FIGS. 5, 6 and 8. It should be noted that, different inductive network topologies utilizing a different number of inductive elements may be contemplated in different embodiments. In some cases, the magnitude of the series inductor (and optionally the parallel inductor) selected for each branch may be the same. In other cases, the magnitude of inductors may vary across different branches. In yet other cases, the magnitude of the series inductor in a branch may be the same or different from the magnitude of the parallel inductor (e.g., parallel inductor of the same branch, single parallel inductor shared between branches). As described above in relation to FIGS. 1-10, a first end of the at least one series inductor of each branch may be coupled to the resonant capacitor bridge circuit (e.g., a center of the half-bridge configuration of capacitors).

At Block 1110, the method may comprise coupling the AC signal through the resonant capacitor bridge and the resonant inductor network to one or more groups of transformers, wherein each group comprises a plurality of transformers, and wherein each transformer includes a primary and a secondary winding, the secondary windings configured to be coupled to an output load. In some cases, the number of transformers in each group may be the same or different. Further, the number of transformers per group and/or the number of groups described in this disclosure is not intended to be limiting, and different numbers of transformers per group and/or different numbers of groups may be utilized in different embodiments.

At Block 1112, the method 1100 may comprise coupling each group of transformers to one branch of the plurality of branches such that the primary windings of the plurality of transformers of a respective group are in parallel, wherein one end of the primary windings of the transformers in a respective group is coupled to a respective second end of the at least one series inductor of a respective branch, and wherein another end of the primary windings of the transformers is coupled to the switch network.

In some embodiments, the at least one parallel inductor comprises a parallel inductor for each branch of the plurality of branches. In some cases, the parallel inductor of each branch may be coupled in parallel across the primary windings of the transformers of a respective group (e.g., inductor network topology shown in FIG. 7). In other cases, the at least one parallel inductor may comprise a single parallel inductor shared between the plurality of branches (e.g., inductor network topology shown in FIG. 8). In such cases, the plurality of branches, each coupled to one group of transformers or output modules, may be coupled in parallel across the single parallel inductor. In some cases, the first end of the at least one series inductor of each branch may be coupled to one end of the single parallel inductor, and the second end of the at least one series inductor of each branch may be coupled in series to the primary windings of the transformers of a respective group.

In some embodiments, one end of the at least one parallel inductor may be coupled to a center of the half bridge of MOSFETs. Further, the first end of the at least one series inductor may be coupled to a center of the resonant capacitor half bridge.

Figure 12:
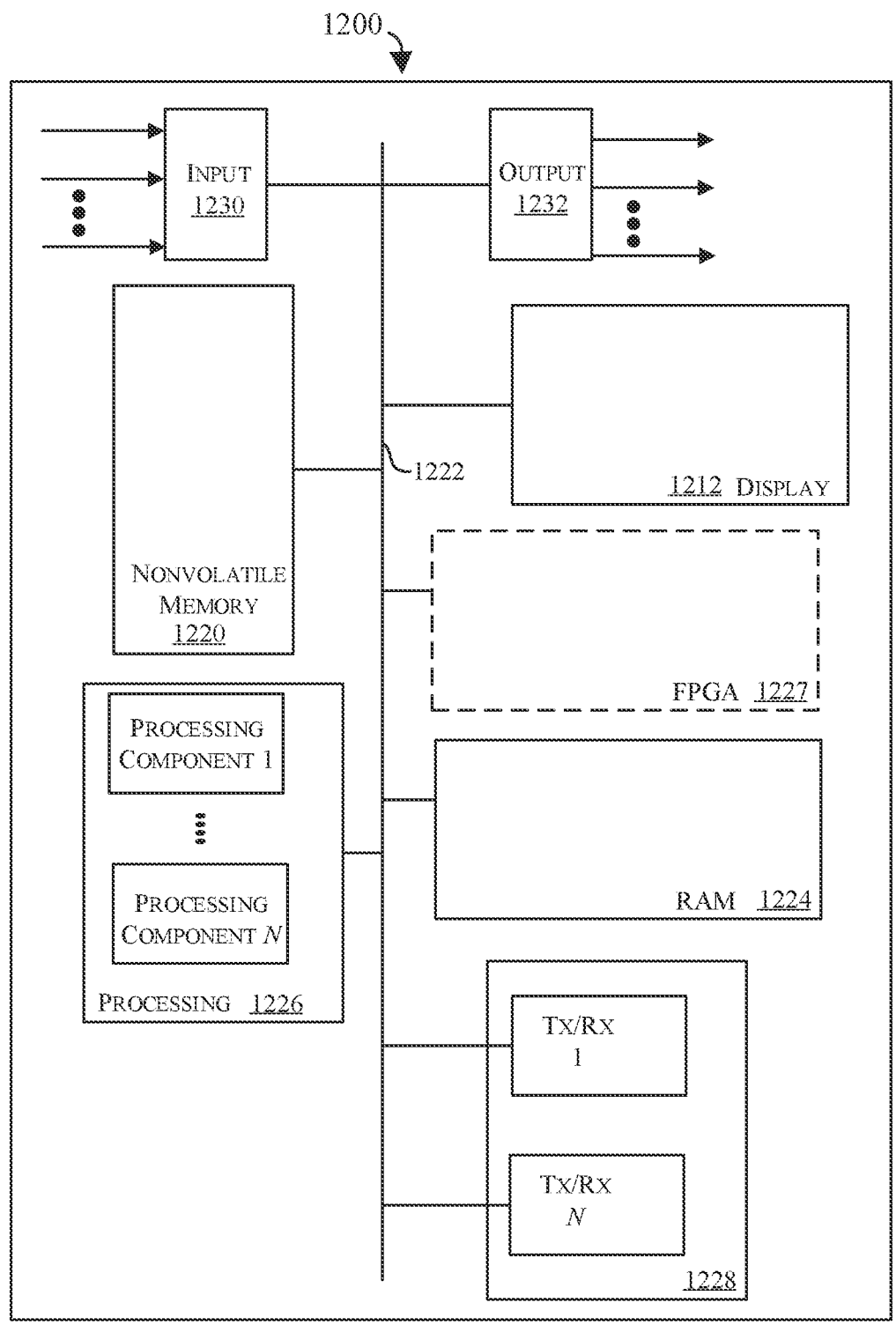
FIG. 12 is a block diagram illustrating a computer system according to one or more embodiments of the disclosure.
Figure 13A:
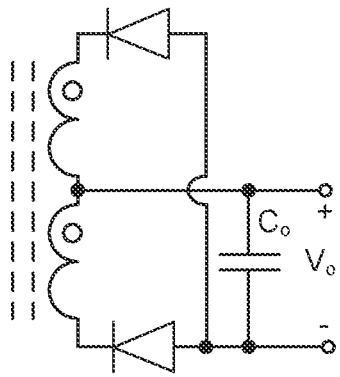
FIGS. 13A, 13B, 13C, 13D, and 13E illustrate example topologies of rectifier circuits in accordance with one or more implementations.
Figure 13B:
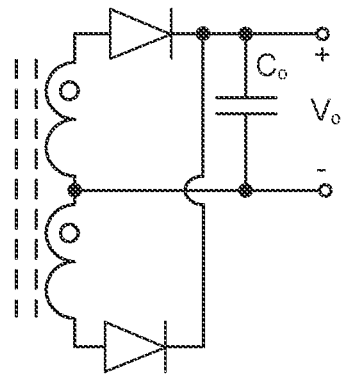
Figure 13C:
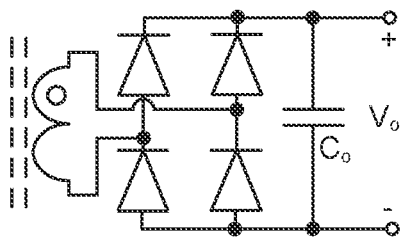
Figure 13D:
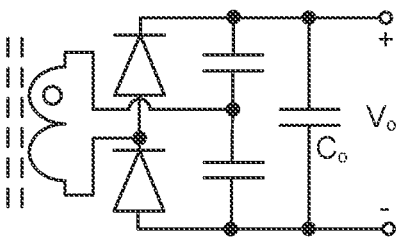
Figure 13E:
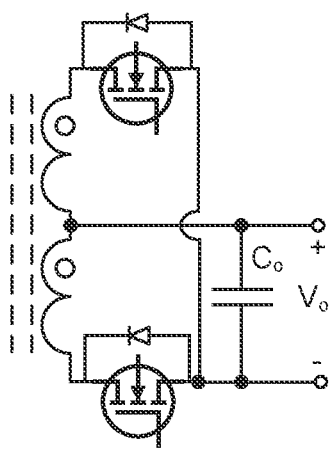

The methods described in connection with the embodiments disclosed herein may be embodied directly in hardware, in processor-executable code encoded in a non-transitory tangible processor readable storage medium, or in a combination of the two. Referring to FIG. 12 for example, shown is a block diagram 1200 depicting physical components that may be utilized to realize the controller 106 according to an exemplary embodiment. As shown, in this embodiment a display portion 1212 and nonvolatile memory 1220 are coupled to a bus 1222 that is also coupled to random access memory ("RAM") 1224, a processing portion (which includes N processing components) 1226, an optional field programmable gate array (FPGA) 1227, and a transceiver component 1228 that includes N transceivers. Although the components depicted in FIG. 12 represent physical components, FIG. 12 is not intended to be a detailed hardware diagram; thus many of the components depicted in FIG. 12 may be realized by common constructs or distributed among additional physical components. Moreover, it is contemplated that other existing and yet-to-be developed physical components and architectures may be utilized to implement the functional components described with reference to FIG. 12.

This display portion 1212 generally operates to provide a user interface for a user, and in several implementations, the display is realized by a touchscreen display. In general, the nonvolatile memory 1220 is non-transitory memory that functions to store (e.g., persistently store) data and processor-executable code (including executable code that is associated with effectuating the methods described herein). In some embodiments for example, the nonvolatile memory 1220 includes bootloader code, operating system code, file system code, and non-transitory processor-executable code to facilitate the execution of a method described with reference to FIG. 11 described herein.

In many implementations, the nonvolatile memory 1220 is realized by flash memory (e.g., NAND or ONENAND memory), but it is contemplated that other memory types may be utilized as well. Although it may be possible to execute the code from the nonvolatile memory 1220, the executable code in the nonvolatile memory is typically loaded into RAM 1224 and executed by one or more of the N processing components in the processing portion 1226.

The N processing components in connection with RAM 1224 generally operate to execute the instructions stored in nonvolatile memory 1220 to enable driving a plurality of output circuits from a DC input signal. For example, non-transitory, processor-executable code to effectuate the methods described herein may be persistently stored in nonvolatile memory 1220 and executed by the N processing components in connection with RAM 1224. As one of ordinarily skill in the art will appreciate, the processing portion 1226 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1226 may be configured to effectuate one or more aspects of the methodologies described herein (e.g., the method described with reference to FIG. 11). For example, non-transitory processor-readable instructions may be stored in the nonvolatile memory 1220 or in RAM 1224 and when executed on the processing portion 1226, cause the processing portion 1226 to perform a method for driving a plurality of output circuits from a DC input signal. Alternatively, non-transitory FPGA-configuration-instructions may be persistently stored in nonvolatile memory 1220 and accessed by the processing portion 1226 (e.g., during boot up) to configure the hardware-configurable portions of the processing portion 1226 to effectuate the functions disclosed herein (including the functions of the controller 106).

The input component 1230 operates to receive signals (e.g., measurements of one or more output voltages at the output loads, collector and emitter signals from the opto-coupler modules 110, etc.) that are indicative of one or more aspects of the techniques described herein. The signals received at the input component may include, for example, signals from the emitter and/or collector of the opto-coupler modules, control signals from a user interface, output voltage signals, data signals, and power control signals, to name a few non-limiting examples. The output component generally operates to provide one or more analog or digital signals to effectuate an operational aspect of the driving of a plurality of output circuits from a DC input signal. For example, the output portion 1232 may provide as output, a dataset pertaining to the output voltage signals at the different output loads, a dataset pertaining to the ripple voltage signals, etc.

The depicted transceiver component 1228 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A resonant converter circuit comprising:
    a switch network, a resonant tank, and a rectifier network, wherein the switch network is coupled at one end to a voltage or current source, and at a second end to the resonant tank;
    wherein the resonant tank comprises:
        a resonant capacitor bridge coupled across the switch network;
        a plurality of branches, each branch comprising one or more resonant inductors, including at least one series inductor, wherein a first end of the at least one series inductor is coupled to the resonant capacitor bridge, and wherein a second end of the at least one series inductor is coupled to a rectifier network; and
        at least one parallel inductor;
    wherein the rectifier network comprises:
        one or more groups of transformers, each group coupled to one branch of the plurality of branches, wherein each group comprises a plurality of transformers, and wherein each transformer of the one or more groups of transformers comprises primary and secondary windings, the secondary windings configured for coupling to an output load; and
        a plurality of connections to couple the plurality of transformers of each group in parallel, wherein one end of the primary windings of each of the plurality of transformers is coupled to a respective second end of the at least one series inductor of a respective branch, and wherein another end of the primary windings of each of the plurality of transformers is coupled to the switch network.

2. The resonant converter circuit of claim 1, wherein the at least one parallel inductor comprises a parallel inductor for each branch of the plurality of branches, the parallel inductor of each branch coupled in parallel across the primary windings of the transformers of a respective group.

3. The resonant converter circuit of claim 1, wherein a number of series inductors of the plurality of branches equals a number of parallel inductors of the plurality of branches.

4. The resonant converter circuit of claim 1, wherein a number of series inductors is greater than a number of the at least one parallel inductor.

5. The resonant converter circuit of claim 1, wherein the at least one parallel inductor comprises a single parallel inductor, and wherein the plurality of branches of the resonant tank are coupled in parallel across the single parallel inductor.

6. The resonant converter circuit of claim 5, wherein the first end of the at least one series inductor of each branch is coupled to one end of the single parallel inductor, and wherein the second end of the at least one series inductor of each branch is coupled in series to the primary windings of the transformers of a respective group via a portion of the plurality of connections.

7. The resonant converter circuit of claim 1, wherein at least one transformer of a group of transformers is a center tapped transformer, and wherein a rectifier circuit is coupled across secondary windings of the center tapped transformer.

8. The resonant converter circuit of claim 7, wherein the rectifier circuit comprises a first rectifier switch coupled at a first end to a first end of the secondary windings of the center tapped transformer, and a second rectifier switch coupled at a first end to a second end of the secondary windings of the center tapped transformer.

9. The resonant converter circuit of claim 8, further comprising: a capacitor configured to be coupled across the output load such that one end of the capacitor is configured to be coupled to a positive terminal of the output load and a central output winding of the center tapped transformer, and another end of the capacitor is configured to be coupled to a negative terminal of the output load and second ends of the first and second rectifier switches.

10. The resonant converter circuit of claim 1, wherein the rectifier network further comprises:
a plurality of rectifier circuits, each rectifier circuit coupled across the secondary windings of one transformer of the plurality of transformers, each rectifier circuit comprising a capacitor and one or more switches, and wherein the capacitor is coupled across a respective output load.

11. The resonant converter circuit of claim 10, wherein each rectifier circuit is selected from a group consisting of a half-wave and full-wave rectifier, and wherein the full-wave rectifier comprises one of a center tapped full wave rectifier or a bridge rectifier.

12. The resonant converter circuit of claim 1, wherein the switch network comprises a half bridge pair of switches, and wherein the switches are selected from a group consisting of a Metal Oxide Semiconductor Field Effect Transistor (MOSFET), a Bipolar Junction Transistor (BJT), a FinFET, a power MOSFET, and an Insulated-Gate Bipolar Transistor (IGBT).

13. The resonant converter circuit of claim 1, wherein the switch network comprises a half bridge pair of MOSFETs.

14. The resonant converter circuit of claim 13, wherein one end of the at least one parallel inductor is coupled to a center of the half bridge pair of MOSFETs.

15. The resonant converter circuit of claim 1, wherein the resonant capacitor bridge comprises a resonant capacitor half bridge comprising two capacitors arranged in series, and wherein the first end of the at least one series inductor for each of the plurality of branches is coupled to a center of the resonant capacitor half bridge.

16. A method for driving a plurality of output circuits from a DC input signal, the method comprising:
providing a switch network;
converting the DC input signal to an AC signal using the switch network;
coupling a resonant capacitor bridge across the switch network;
coupling a resonant inductor network to the switch network and the resonant capacitor bridge, the resonant inductor network comprising at least one parallel inductor and a plurality of branches, each branch comprising one or more inductors, including at least one series inductor, wherein a first end of the at least one series inductor is coupled to the resonant capacitor bridge;
coupling the AC signal through the resonant capacitor bridge and the resonant inductor network to one or more groups of transformers, wherein each group comprises a plurality of transformers, and wherein each transformer includes a primary and a secondary winding, the secondary windings coupled to an output load; and
coupling each group of transformers to one branch of the plurality of branches such that the primary windings of the plurality of transformers of a respective group are in parallel, wherein one end of the primary windings of the transformers in a respective group is coupled to a respective second end of the at least one series inductor of a respective branch, and wherein another end of the primary windings of the transformers is coupled to the switch network.

17. The method of claim 16, wherein the at least one parallel inductor comprises a parallel inductor for each branch of the plurality of branches, the method further comprising:
coupling the parallel inductor of each branch in parallel across the primary windings of the transformers of a respective group.

18. The method of claim 16, wherein the at least one parallel inductor comprises a single parallel inductor, the method further comprising:
coupling the plurality of branches in parallel across the single parallel inductor.

19. The method of claim 18, further comprising:
coupling the first end of the at least one series inductor of each branch to one end of the single parallel inductor; and
coupling the second end of the at least one series inductor of each branch in series to the primary windings of the transformers of a respective group.

20. The method of claim 16, wherein the switch network comprises a half bridge pair of MOSFETs, and wherein the resonant capacitor bridge comprises a resonant capacitor half bridge, the method further comprising:
coupling one end of the at least one parallel inductor to a center of the half bridge pair of MOSFETs; and coupling the first end of the at least one series inductor to a center of the resonant capacitor half bridge.

\* \* \* \* \*